(12) United States Patent
Chung

(10) Patent No.: US 7,455,363 B2
(45) Date of Patent: Nov. 25, 2008

(54) DEVICE FOR MOVING HEADREST BACK AND FORTH

(75) Inventor: Hae Il Chung, Inchon (KR)

(73) Assignee: Woobo Tech Co. Ltd, Kyunggi-do (KR)

( * ) Notice: Subject to any disclaimer, the term of this patent is extended or adjusted under 35 U.S.C. 154(b) by 41 days.

(21) Appl. No.: 10/553,339

(22) PCT Filed: Apr. 14, 2004

(86) PCT No.: PCT/KR2004/000866

§ 371 (c)(1),
(2), (4) Date: Oct. 14, 2005

(87) PCT Pub. No.: WO2004/089688

PCT Pub. Date: Oct. 21, 2004

(65) Prior Publication Data

US 2007/0013219 A1    Jan. 18, 2007

(30) Foreign Application Priority Data

Apr. 14, 2003    (KR) .................... 10-2003-0023513

(51) Int. Cl.
*A47C 7/36* (2006.01)

(52) U.S. Cl. .................... 297/407; 297/406; 297/391
(58) Field of Classification Search ................ 297/391, 297/406, 407, 408, 216.12
See application file for complete search history.

(56) References Cited

U.S. PATENT DOCUMENTS

| 4,304,439 | A | * | 12/1981 | Terada et al. | ................. 297/409 |
| 4,640,549 | A | * | 2/1987 | Yokota | ....................... 297/410 |
| 4,674,797 | A | * | 6/1987 | Tateyama | .................... 297/408 |
| 4,733,913 | A | * | 3/1988 | Tateyama | .................... 297/409 |
| 6,000,760 | A | | 12/1999 | Chung | |

FOREIGN PATENT DOCUMENTS

GB    2 298 134    2/1996

* cited by examiner

*Primary Examiner*—Sarah B McPartlin
(74) *Attorney, Agent, or Firm*—Dilworth & Barrese, LLP.

(57) ABSTRACT

A device for moving headrest back and forth for automobile in which a tilt adjusting device and a back and forth movement device are united into a single device is provided. The device comprises a stay 114, a ratchet member RM, a tilt adjusting device (TAD), a check member CM, a back and forth movement device MD, a first torsion coil spring 130, one or a pair of second torsion coil springs 121 and a mobile shaft 122 for the back and forth movement device (MD).

17 Claims, 26 Drawing Sheets

PRIOR ART

PRIOR ART

PRIOR ART

PRIOR ART

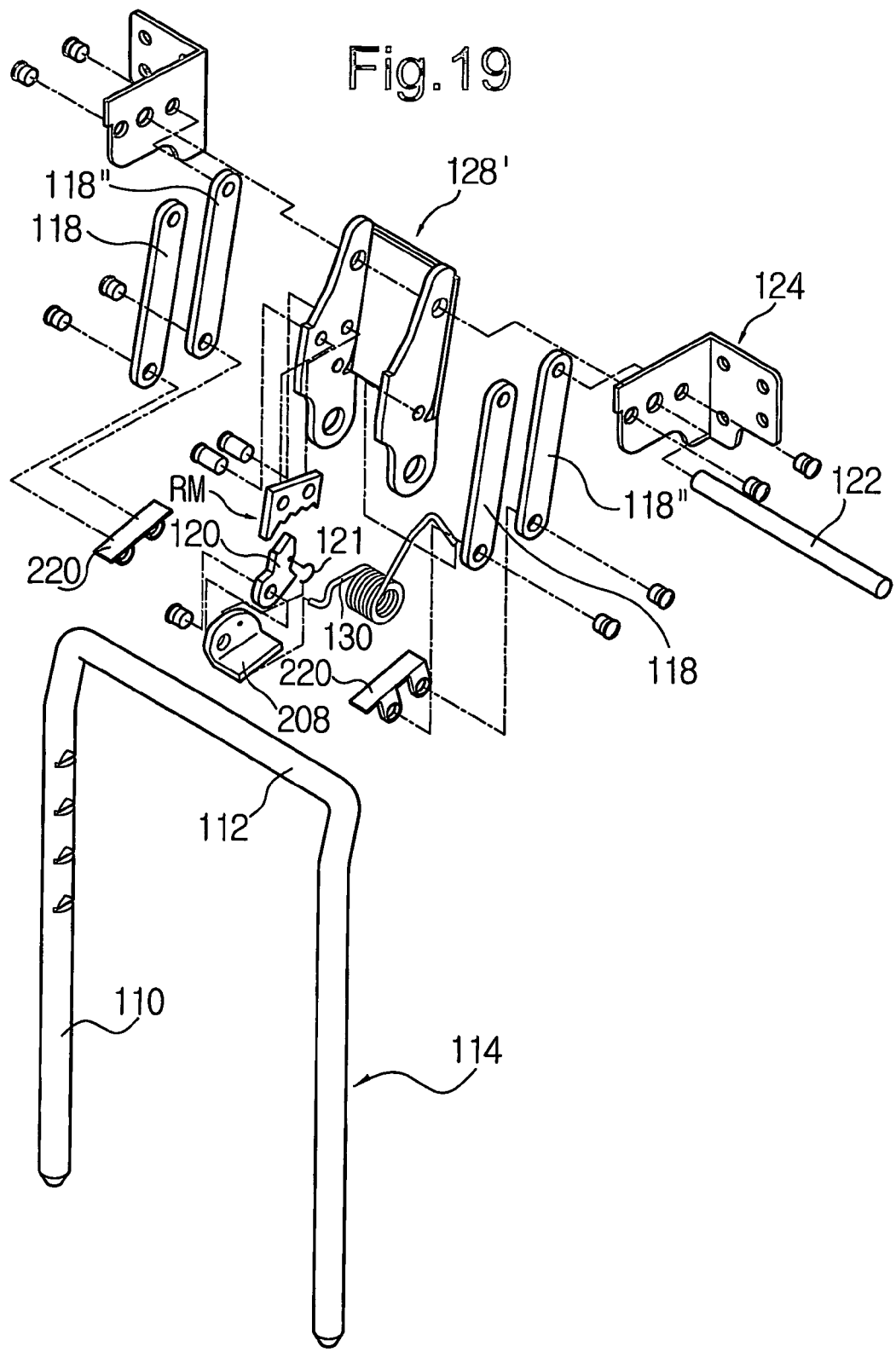

DEVICE FOR MOVING HEADREST BACK AND FORTH

BACKGROUND OF THE INVENTION

1. Technical Field

The present invention relates to a device for moving headrest back and forth for automobile, and more particularly, to a device for moving headrest back and forth for automobile by which the automobile headrest can be moved back and forth or returned to its original position by pushing it backward.

2. Background Art

Automobile headrests are generally mounted on top of a backrest of a car seat and designed to pivot on a shaft by means of a tilting device. The headrest is used as a head support, while it may be lifted, lowered or tilted for the occupant's convenience. The headrest can also perform the function of supporting the back of the occupant's head to protect the occupant's neck from being injured in the event of a rear-ended car accident.

Recently, known are tiltable automobile headrests with a monitor attached thereto for TV programs or visual traffic information on the screen being watched by the passenger on the rear seat.

Examples include a device for moving headrest back and forth of the U.S. Pat. No. 6,000,760 of the present inventor, disclosure of which is incorporated by reference. As shown in FIGS. 1 to 3b, the device comprises a stay 10 with a horizontal portion 11 and a pair of parallel vertical portions 12 extending from both ends of the horizontal portion 11; a ratchet member 20 fixed to the horizontal portion 11 of the stay 10 and having a plurality of teeth 21 and a jaw 22, a tilt adjusting device 30 having a pair of parallel side panels each having a lower portion in pivotal engagement with the horizontal portion 11 of the stay 10; a first torsion coil spring 40 mounted on the horizontal portion 11 of the stay 10; a check member 50 having teeth 51 and a jaw to prevent the reverse rotation of the tilt adjusting device 30; and a second torsion coil spring 60, opposite ends of which are respectively hung on upper parts of one of the side panels 31 of the tilt adjusting device 30 and the check member 50; a back and forth movement device 100 provided with two pairs of levers 90 and arranged to move a cover 80 back and forth; and a mobile shaft 95 connecting the device 100 to the tilt adjusting device 30.

In the above described device for moving headrest back and forth, the cover 80 is moved back and forth by means of two pairs of front and rear levers 90. When the headrest is to be returned to the original front position from the intermediate or rear position, the cover 80 is pushed back further and thus the headrest itself is moved to the utmost rear position.

After the teeth 51 of the check member 50 engage fully with the teeth 21 of the ratchet member 20, the teeth 51 is then disengaged from the teeth 21 by means of a pushing force applied to the cover 80 and the force of the second torsion coil spring 60 so that the headrest carried by the traversing device 100 may be returned to the original position by the force of the first torsion coil spring 40, when the pushing force is removed.

However, the above described traversing device has problems in that it has a relatively complicated structure, as the tilt adjusting device and the back and forth movement device are separately required, resulting in increased production costs and time and lowered work efficiency during manufacture thereof.

SUMMARY OF THE INVENTION

The present invention is conceived to solve the aforementioned problems. An object of the present invention is, therefore, to provide a device for moving headrest back and forth for automobile, wherein a tilt adjusting device and a back and forth movement device for the headrest are combined, thereby reducing production costs and improving work efficiency of the device for moving headrest back and forth.

According to an aspect of the present invention for achieving the above and other objects, there is provided a device for moving headrest back and forth for automobile comprising a stay mounted on top of the back rest of a seat with a horizontal portion and a pair of parallel vertical portions; a ratchet member provided with a gear portion formed with a plurality of teeth and a jaw; a tilt adjusting device comprising a pair of parallel links each having a lower portion in pivotal engagement with the horizontal portion of the stay; a check member comprising one or a pair of pivotable gears having teeth to travel on and engage with the teeth of the ratchet member installed so that the reverse rotation of the tilt adjusting device may be prevented; a back and forth movement device comprising a pair of parallel levers, one end of which is pivotably connected to the horizontal portion of the stay and arranged to move the headrest back and forth; a first torsion coil spring, two ends of which are respectively hooked on the horizontal portion of the stay and one of the links of the tilt adjusting device or one of the levers of the back and forth movement device; one or a pair of second torsion coil springs having one end hooked on the pivotable gear; and a mobile shaft axially mounted to pass through upper portions of the parallel levers of the back and forth movement device.

According to an aspect of the present invention, the device for moving headrest back and forth comprises one or a pair of mounting panels fixed on the mobile shaft.

According to an aspect of the present invention, the ratchet member has two stationary gear portions and is installed on one of parallel members of either the tilt adjusting device or the back and forth movement device as well as the horizontal portion of the stay.

According to another aspect of the present invention, the parallel members of either the tilt adjusting device or the back and forth movement device are installed in pivotal engagement with the horizontal portion of the stay by means of a shaft passing through the pivotal holes in the ratchet member or a support for the pivotable gear.

According to another aspect of the present invention, the pivotable gear has a jaw for interacting with the jaw of the ratchet member and is installed on either a support fixed on the horizontal portion of the stay or one of the two parallel members of the tilt adjusting device or the back and forth movement device.

According to still another aspect of the present invention, the first torsion coil spring is wound around the horizontal portion of the stay, while one end thereof is hooked on the ratchet member or the support for the pivotable gear.

According to still another aspect of the present invention, the second torsion coil spring has the other end hooked on one of the parallel members of the tilt adjusting device or the back and forth movement device, while one end may be hooked on the support for the pivotable gear.

BRIEF DESCRIPTION OF THE DRAWINGS

FIG. 19 is an exploded perspective view of the device for moving headrest back and forth of FIG. 18.

DESCRIPTION OF THE PREFERRED EMBODIMENTS

Hereinafter, preferred embodiments of the present invention will be described in detail with reference to the accompanying drawings.

Embodiment 1

Figure 1:
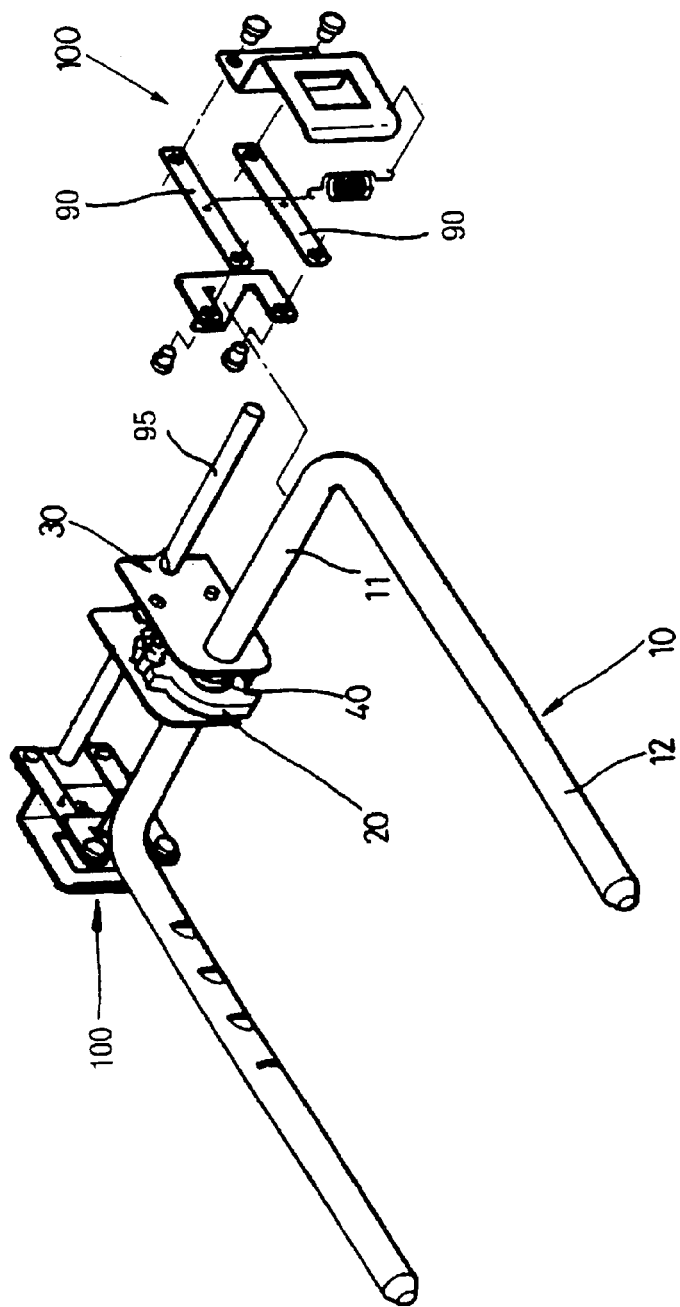
FIG. 1 is a partially exploded perspective view of a device for moving headrest back and forth of the U. S. Pat. No. 6,000,760.
Figure 2:
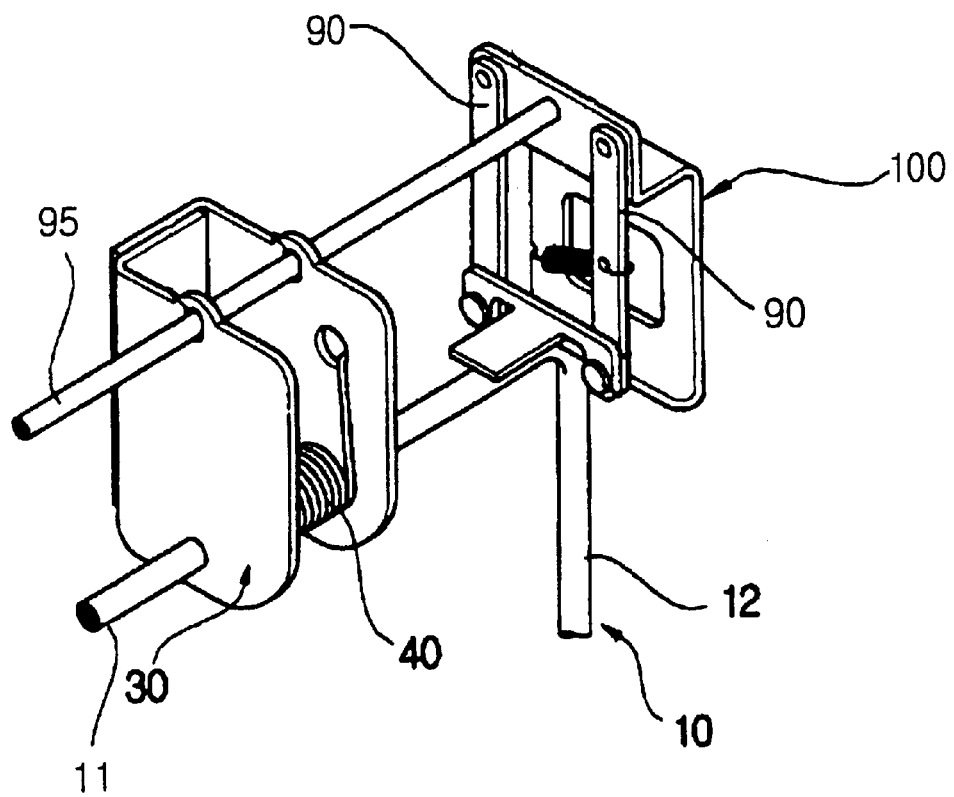
FIG. 2 is a perspective view of the major portion the device of FIG. 1.
Figure 3A:
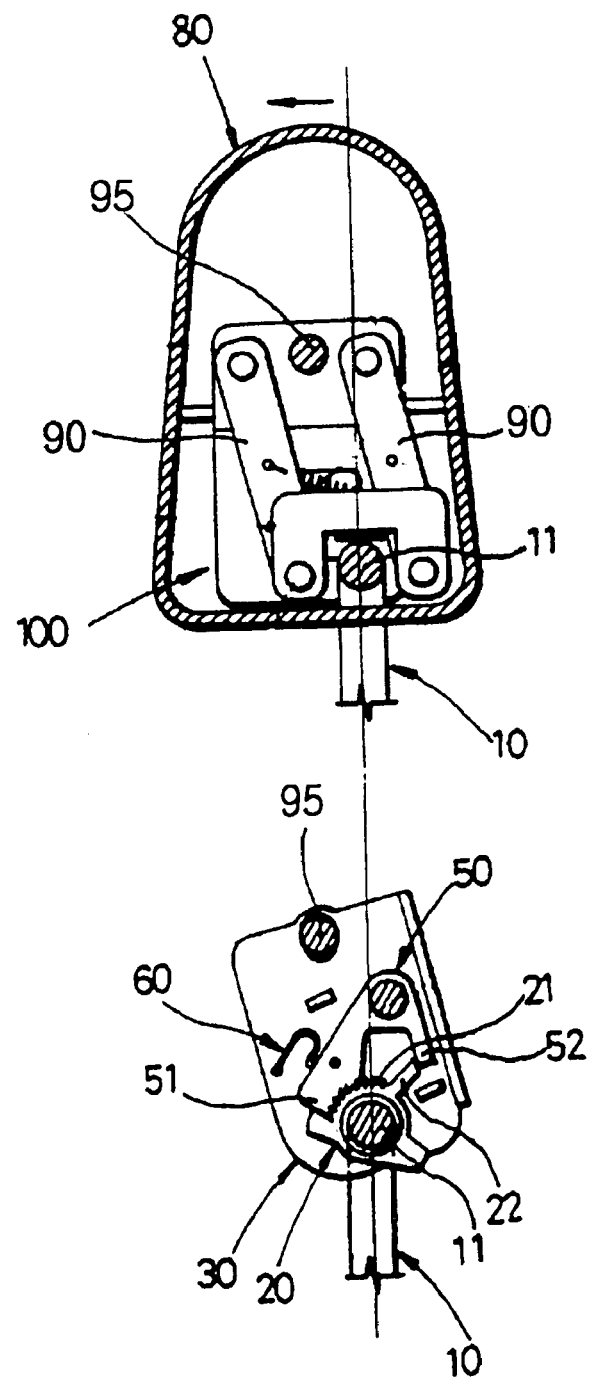
FIGS. 3a and 3b are side sectional views illustrating the operation of the device for moving headrest back and forth of FIG. 1.
Figure 3B:
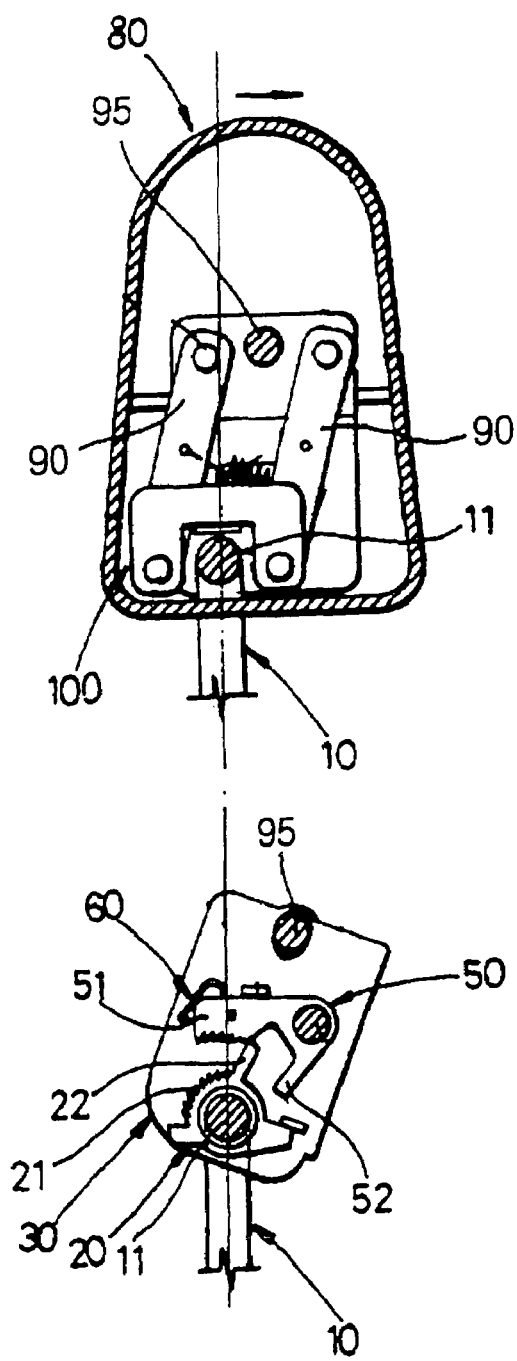
Figure 4:
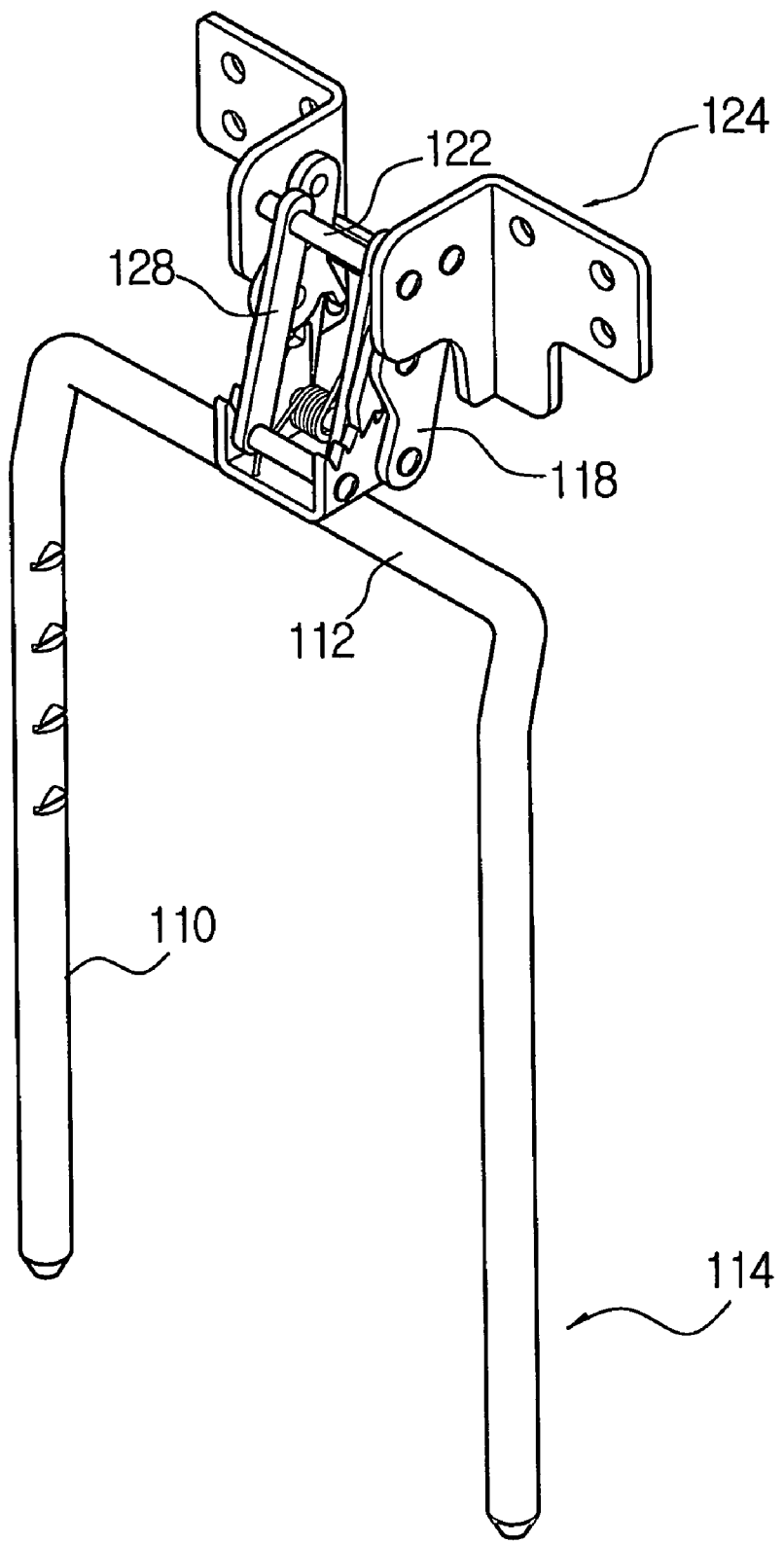
FIG. 4 is a perspective view of a device for moving headrest back and forth according to the first embodiment of the present invention.
Figure 5:
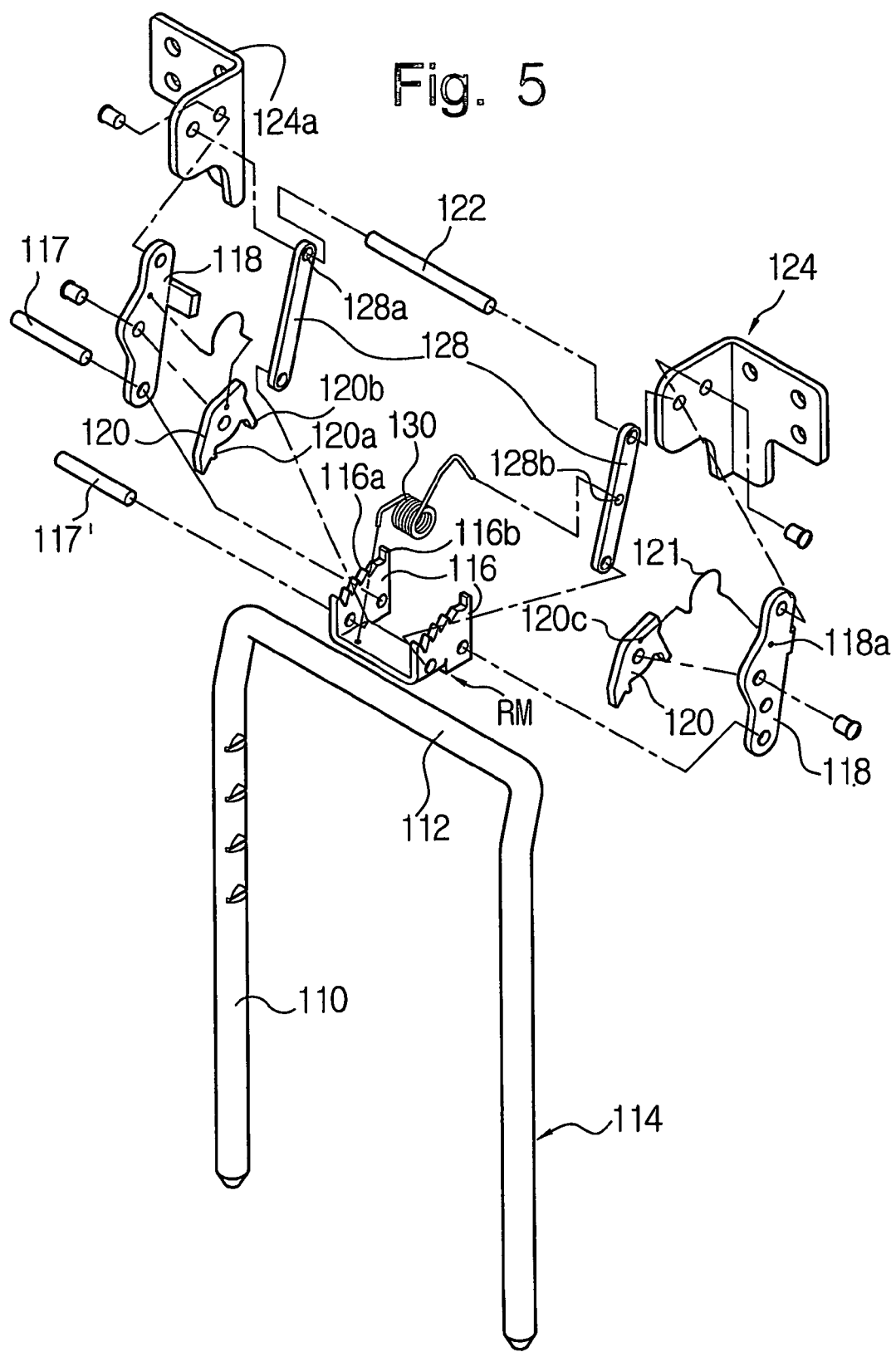
FIG. 5 is an exploded perspective view of the device for moving headrest back and forth of FIG. 4.

FIGS. 4 and 5 are drawings of a device for moving headrest back and forth according to the first embodiment of the present invention. As shown in the drawings, the traversing device comprises; a stay 114 mounted on top of the backrest of a seat and provided with vertical portions 110 and a horizontal portion 112, a ratchet member RM having opposite gear portions 116 and fixedly installed on the horizontal portion 112 of the stay 114, a tilt adjusting device TAD comprising a pair of parallel links 118 each of which has a lower portion in pivotal engagement with the ratchet member 116, a check member CM comprising a pair of pivotable gears 120 pivotably engaging with the parallel links 118, a back and forth movement device MD comprising a pair of parallel levers 128, having lower ends pivotably connected respectively to the ratchet member 116 and arranged to move the headrest back and forth, a first torsion coil spring 130 supported between the ratchet member 116 and one of the parallel levers 128, a pair of second torsion coil springs 121 respectively disposed between the parallel links 118 and the pivotable gears 120, a mobile shaft 122 pivotably connecting the upper portions of the parallel levers 128 and a pair of mounting panels 124 pivotably connected to the upper portions of the parallel links 118 and fixed on both ends of the mobile shaft 122.

The stay 114 is made by bending a steel rod and mounted on top of a seat and comprises a pair of vertical portions 110 spaced apart from each other and a horizontal portion 112 connecting upper ends of the vertical portions 110.

The ratchet member RM is made of a ⌐ shaped plate and fixed on the center of the horizontal portion 112 of the stay 114. The opposite gear portions 116 are formed with a plurality of teeth 116a so as to engage with teeth 120a of the pivotable gear 120 and a jaw 116b for interacting with a jaw 120b of the corresponding pivotable gear 120, rotatably coupled to the corresponding parallel link 118 by a pivot.

Both lower ends of the parallel links 118 are pivotably engaged with a shaft 117 which is arranged to pass through pivot holes on the rear side of the gear portions 116 of the ratchet member RM. The upper end of each parallel link 118 is pivotably connected to the rear side of the corresponding mounting panel 124.

A hanging hole 118a is formed at the upper portion of each parallel link 118 so that one end of each second torsion coil spring 121, preferably a wire spring, may be hooked therein, while the other end of each second torsion coil spring 121 is hooked in a hanging hole 120c on each pivotable gear 120.

Each mounting plate 124, made by bending a plate, is axially fitted to the respective parallel link 118 and fixed on the corresponding end of the mobile shaft 122.

Surfaces 124a of the mounting panels 124 may be fixed to the inner surface of a cover 126 of the headrest or arranged to carry a monitor or a small TV set.

Each parallel lever 128 has one end pivotably installed on the inner surface of the gear portions 116 of the ratchet member RM by means of shaft 117' and the other end with a pivot hole 128a pivotably receiving the mobile shaft 122.

The first torsion coil spring 130 is an elastic means for causing the back and forth movement device MD, the mounting panels 124 and ultimately the headrest to return to their original positions. The first torsion coil spring 130 may be supported between the ratchet member RM and one of the parallel levers 128 with one end hung on either of the ratchet member RM and the shafts 117, 117' and the other end inserted in a hanging hole 128b on one of the parallel levers 128.

The pivotable gears 120 supported by the second torsion coil springs 121 are pivotably installed on the parallel links 118 so that the teeth 120a may engage with the teeth 116a of the ratchet member RM.

Further, the device for moving headrest back and forth with or without the mounting panels 124 is covered with a cover 126 of the headrest and the space therein may be filled through the known foaming process to complete the manufacture of the headrest, while the mounting panels may be arranged to carry a monitor or a small TV set alternatively.

Figure 6:
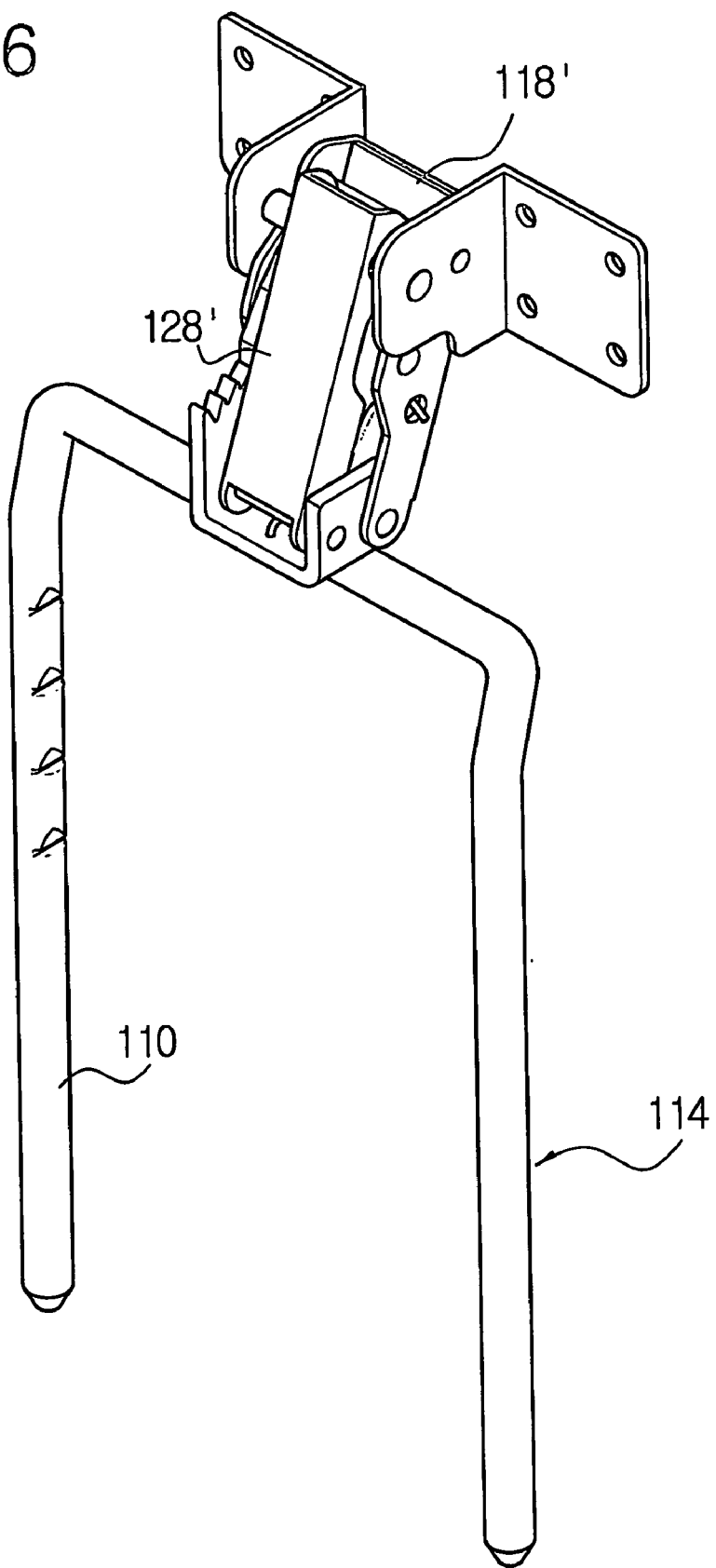
FIG. 6 is a perspective view of a modified device for moving headrest back and forth of the first embodiment of the present invention.
Figure 7:
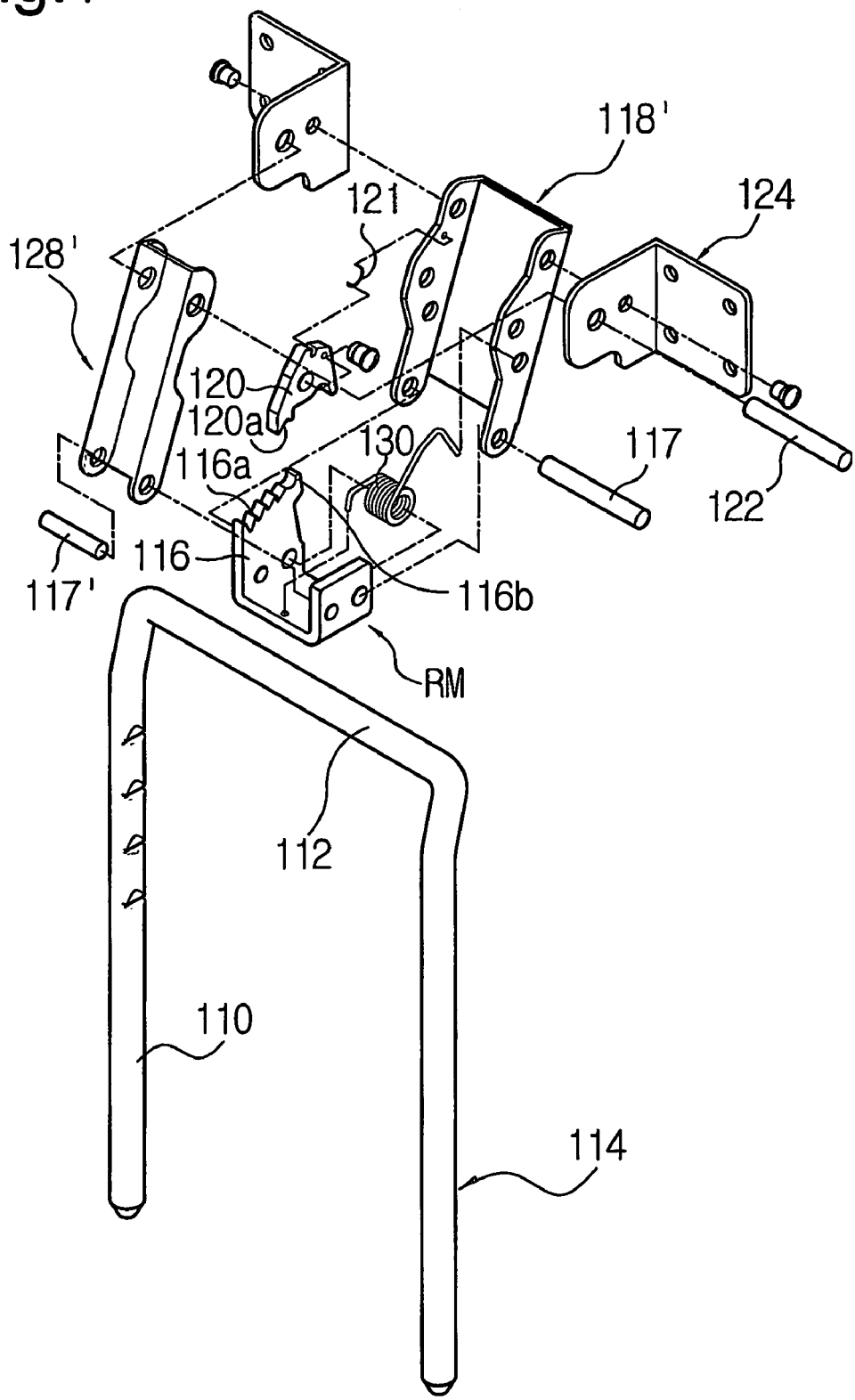
FIG. 7 is an exploded perspective view of the device for moving headrest back and forth of FIG. 6.

FIGS. 6 and 7 show a modified device for moving headrest back and forth of the first embodiment of the present invention. In the modified device, a plurality of teeth 116a are formed on top of one gear portion 116 of a ratchet member RM, and two parallel links 118 and two parallel levers 128 are respectively replaced by a parallel link assembly 118' with the opposite link portions and a parallel lever assembly 128' with the opposite lever portions, while the torsion coil spring 130 is supported between the ratchet member RM and one of the link portions. As other elements are the same as those of the first embodiment, they are not described further herein.

The operations of the above described device for moving headrest back and forth will now be described with reference to FIGS. 8a to 8e.

Figure 8A:
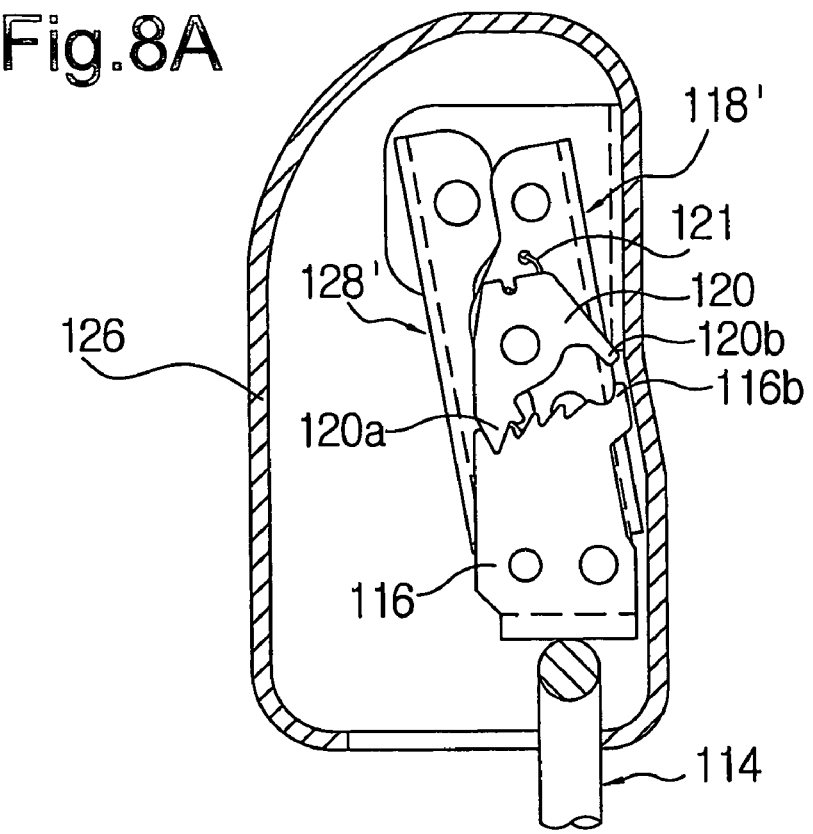
FIGS. 8a to 8e are side sectional views illustrating the operation of the device for moving headrest back and forth of FIGS. 4 or 6.
Figure 8B:
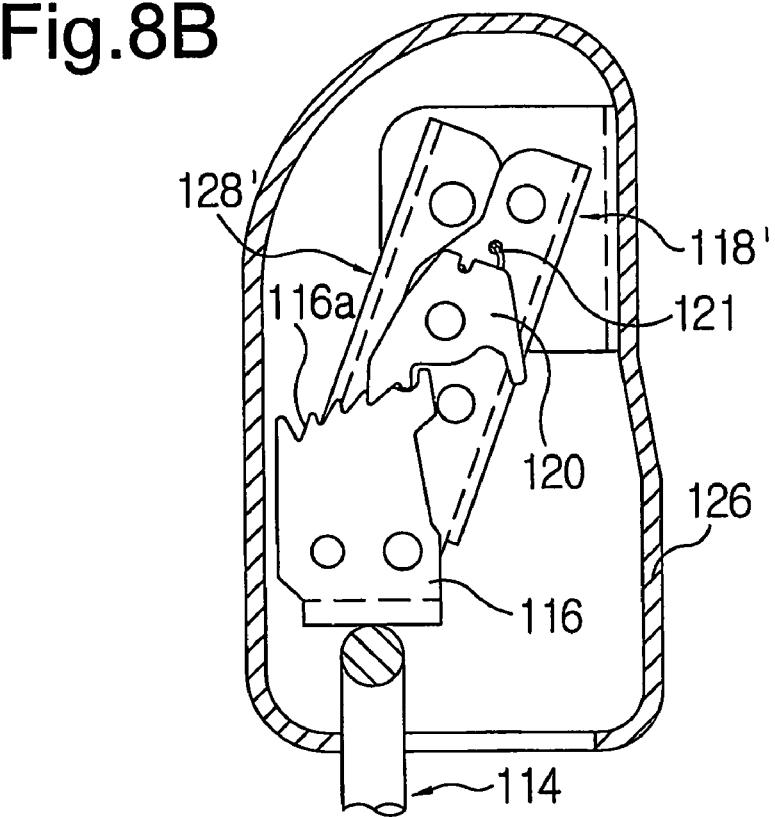

When an occupant on the rear seat pulls the headrest in the original position as FIG. 8a backward, the mounting panels 124 integrally connected to the cover 126 of the headrest is moved back and at the same time, the parallel levers 128 (or the parallel lever assembly 128') of the back and forth movement device MD connected to the mounting panels 124 by the mobile shaft 122 are pivoted backward. The first torsion coil spring 130 supported on the ratchet member RM and one of the parallel levers 128 (or one of the two lever portions of the parallel lever assembly 128') exerts an elastic restoring force on the parallel levers 128 or the back and forth movement device MD.

At this time, the teeth 120a of the pivotable gears 120 installed on the parallel links 118 travel on the teeth 116a of the ratchet member RM, being biased by means of the elastic force of the second torsion coil springs 121.

Figure 8C:
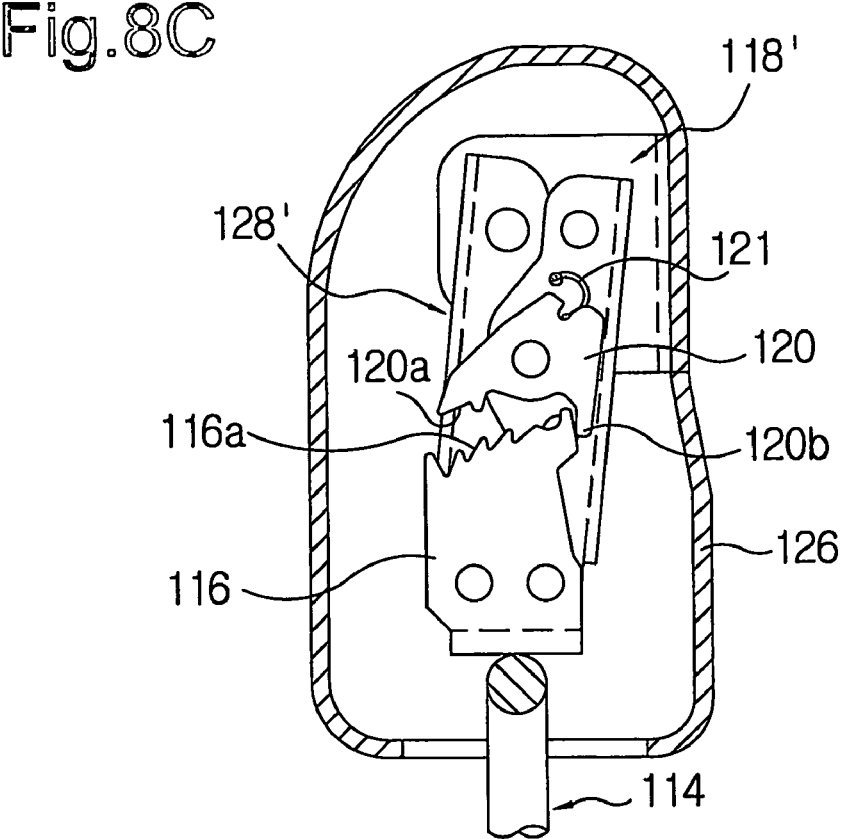
Figure 8D:
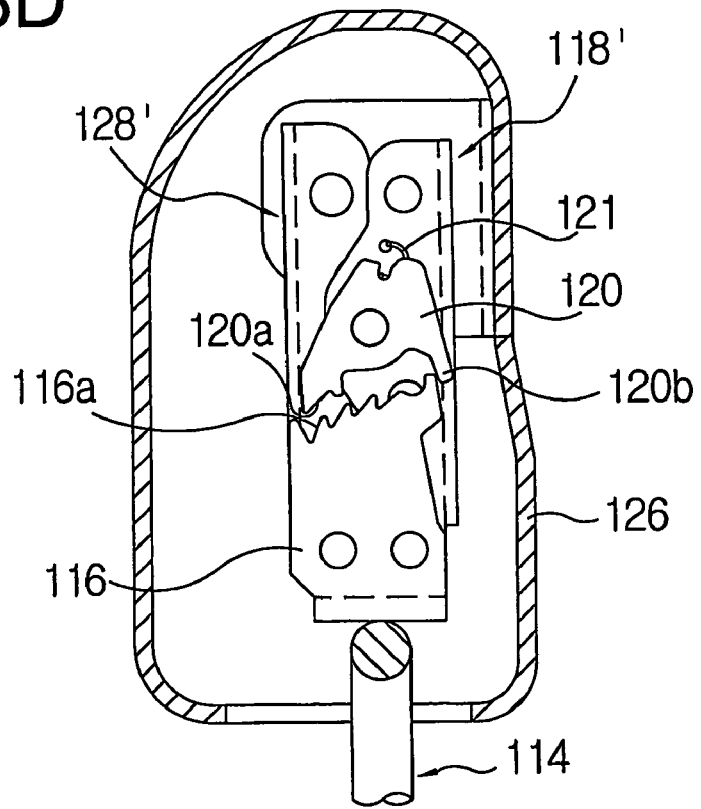
Figure 8E:
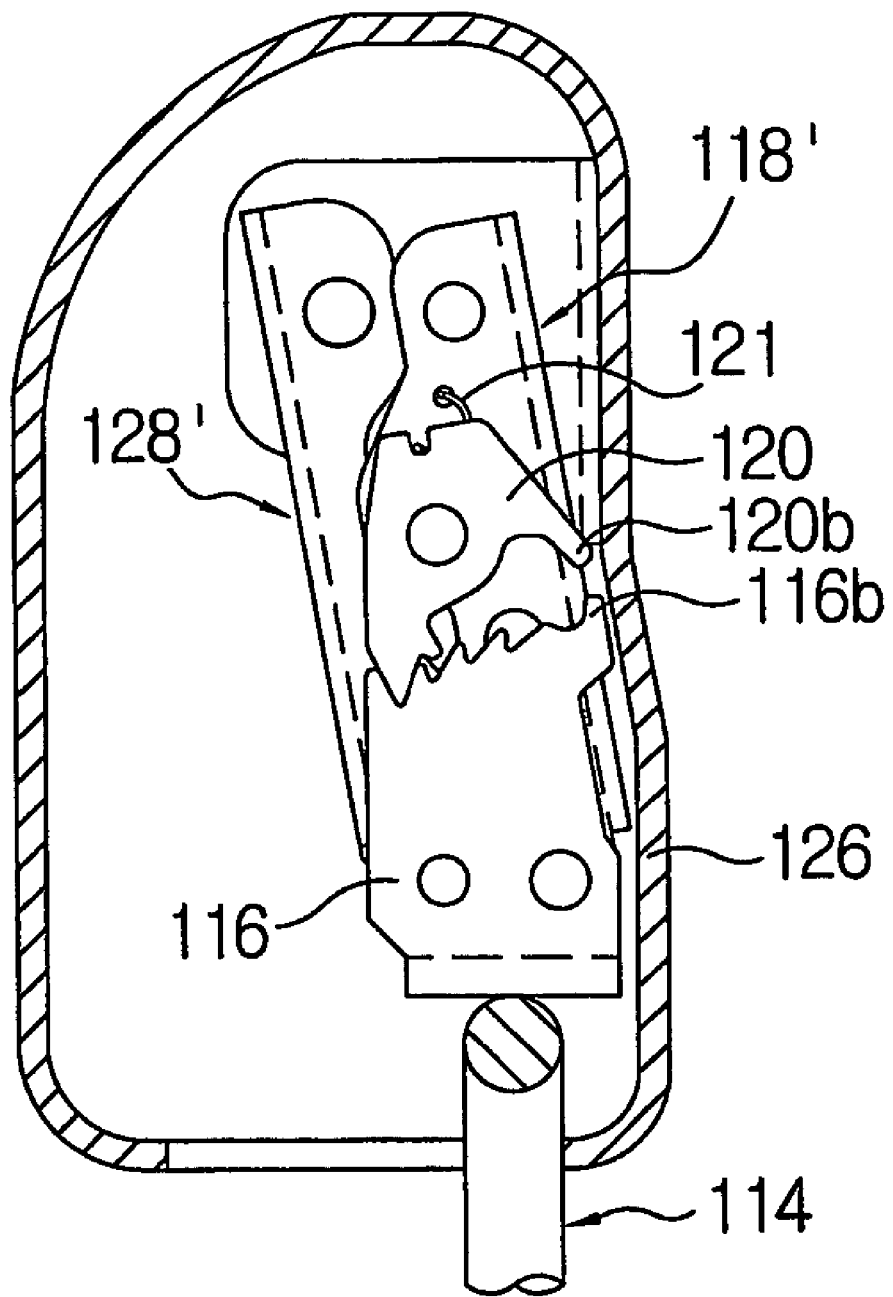

When the teeth 120a of the pivotable gears 120 are about to reach the jaws 116b of the ratchet member RM(see FIG. 8b) and the pulling force applied by the occupant overcomes the elastic forces of the springs 121, the pivotable gears 120 are rotated on the pivot through a certain angle and thus the teeth 120a are disengaged from the teeth 116a of the ratchet member RM(see FIG. 8c).

The pivotable gears 120 rotated on the pivot through a certain angle is then maintained in that position, as they are supported by the elastic force of the springs 121.

When the pulling force is removed after the pivotable gears, separated from the ratchet member RM, are further moved backward by a certain distance in the same direction, the mounting panels 124 are forced to return to the original position, as the elastic restoring force of the first torsion coil spring 130 makes the parallel levers 128 to pivot forward and thus to the original position(see FIG. 8c). At the same time, the jaw 120b is caught by the jaw 116b of the ratchet member RM, making the pivotable gears 120 to be rotated and the teeth 120a of the pivotable gears 120 to engage again with the front part of the teeth 116a of the ratchet member RM(see FIG. 8e).

By means of such a process, the device for moving headrest back and forth is moved back and forth to a position desired by the occupant, or returned back to the original position.

Embodiment 2

Figure 9:
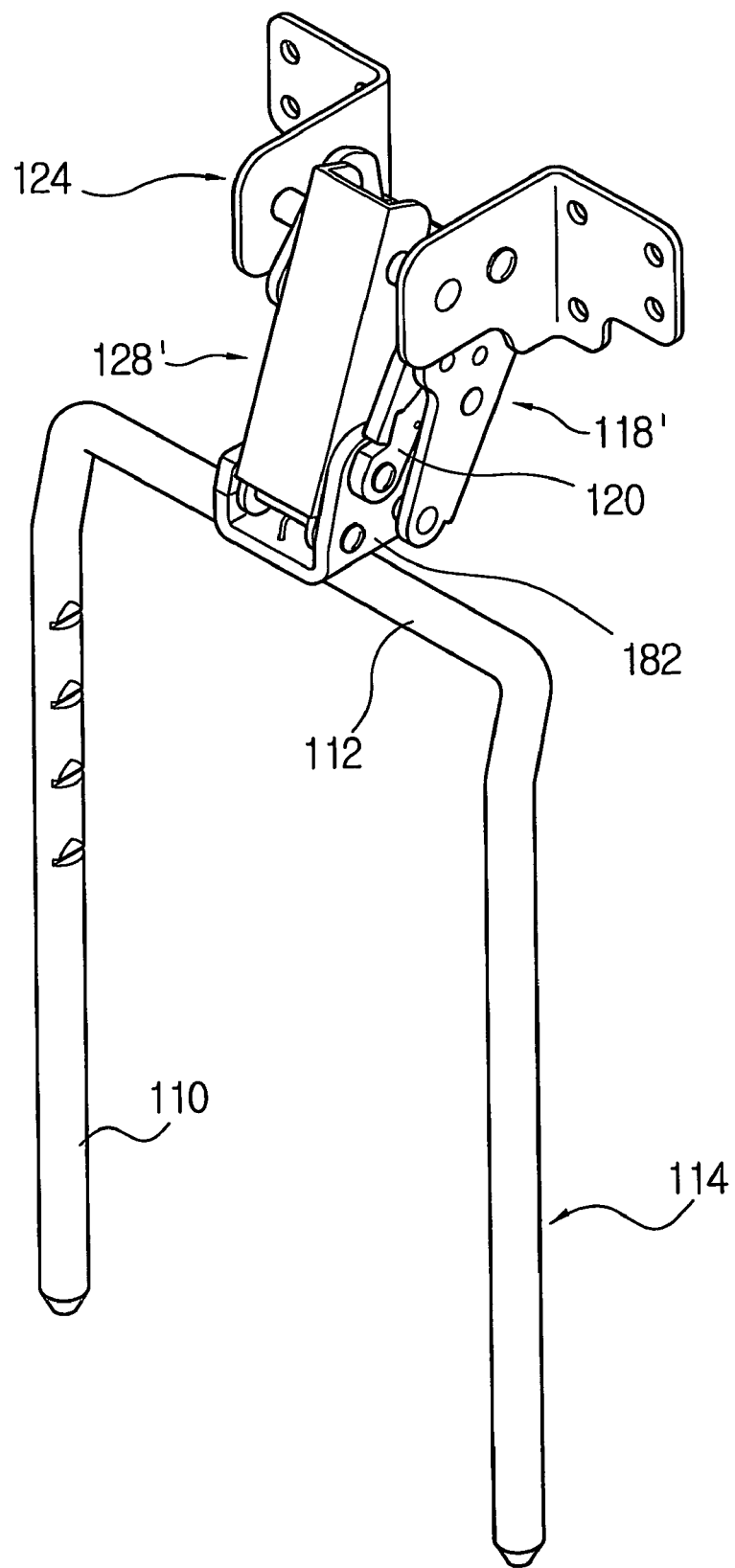
FIG. 9 is a perspective view of a device for moving headrest back and forth according to the second embodiment of the present invention.
Figure 10:
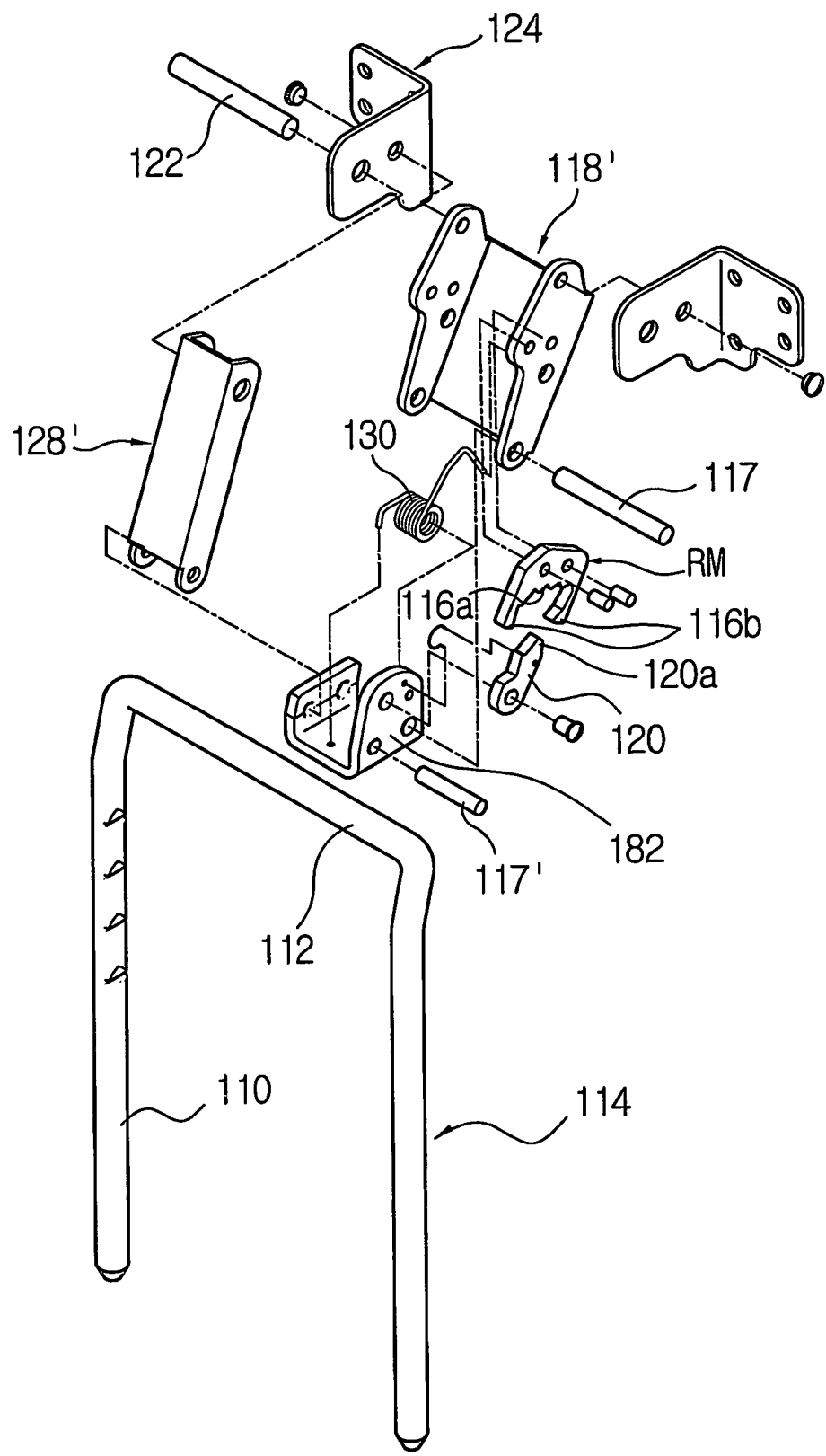
FIG. 10 is an exploded perspective view of the device for moving headrest back and forth of FIG. 9.

FIGS. 9 and 10 are drawings of a device for moving headrest back and forth according to the second embodiment of the present invention. As shown in the drawings, the traversing device comprises; a stay 114 mounted on top of the backrest of a seat and provided with vertical portions 110 and a horizontal portion 112, a check member CM comprising a pivotable gear 120 having teeth 120a and pivotably engaging with a support 182 provided with two pairs of pivot holes on the two parallel walls and fixed on the horizontal portion 112 of the stay 114, a tilt adjusting device TAD comprising a ⊔ shaped parallel link assembly 118' with the opposite link portions, the lower portion of which is in pivotal engagement with the support 182, a ratchet member RM having plurality of teeth 116a and two opposite jaws 116b engaging with teeth 120a of the pivotable gear 120 and fixedly installed on the inner surface of one of the link portions of the parallel link assembly 118', a back and forth movement device MD comprising a parallel lever assembly 128' with the opposite lever portions, one end of which is pivotably connected to the support 182 and which is arranged to move the headrest back and forth, a first torsion coil spring 130 supported between the support 182 and one of the link portions of the parallel link assembly 118', a second torsion coil spring 121 disposed between the support 182 and the pivotable gear 120, a mobile shaft 122 pivotably connecting the upper end of the parallel lever assembly 128, and a pair of mounting panels 124 pivotably connected to the upper portions of the parallel link assembly 118' and fixed on both ends of the mobile shaft 122.

The lower end of the parallel link assembly 118' of the tilt adjusting device TAD is pivotably engaged with a shaft 117 which is arranged to pass through pivot holes on the rear side of the walls of the surppost 182 of the check member CM, while the upper end of the parallel link assembly 118' is pivotably connected to the rear sides of the mounting panels 124.

A hanging hole is formed on the support 182 for the pivotable gear 120 so that one end of the second torsion coil spring 121, preferably a wire spring, may be hooked therein, while the other end of the second torsion coil spring 121 is hooked in a hanging hole on the pivotable gear 120.

Each link portion of the parallel link assembly 118' has one end pivotably installed on the inner surface of the wall of the support 182 of the check member CM by means of shaft 117 and the other end with two pivot holes pivotably receiving the mobile shaft 122.

The first torsion coil spring 130 is an elastic means for causing the tilt adjusting device TAD, the mounting panels 124 and ultimately the headrest to go back to their original positions. The first torsion coil spring 130 may be supported between the support 182 for the pivotable gear 120 and one of the link portions of the parallel link assembly 118' of the tilt adjusting device TAD.

The pivotable gear 120 supported by the second torsion coil spring 121 is pivotably installed on the support 182 so that the teeth 120a may engage with the teeth 116a of the ratchet member RM.

Other structure of the device for moving headrest back and forth of this embodiment is the same as that of the first embodiment and therefore not described further herein.

The operation of the described device for moving headrest back and forth of the second embodiment will now be described with reference to FIGS. 11a to 11d.

Figure 11A:
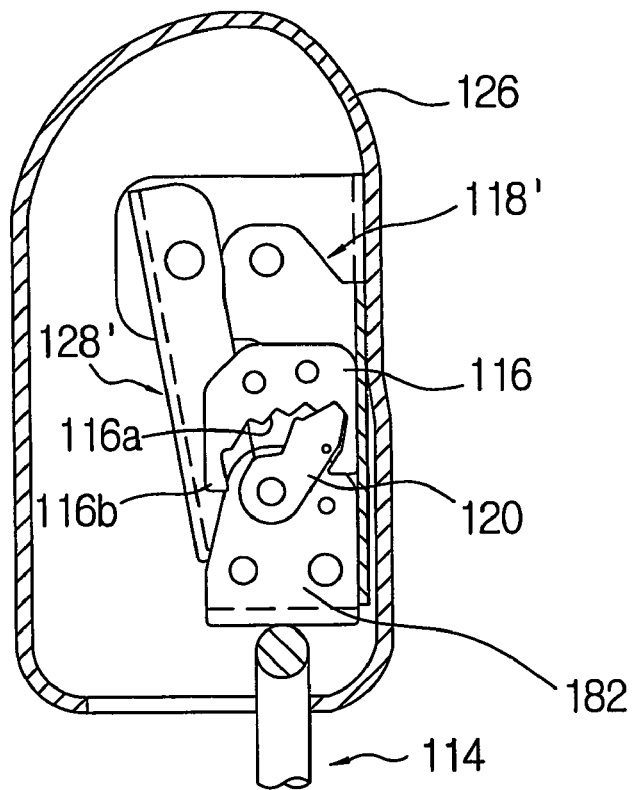
FIGS. 11a to 11d are side sectional views showing the operation of the device for moving headrest back and forth of FIG. 9.

When the headrest in the original position as FIG. 11a is pushed back, the mounting panels 124 integrally connected to a cover 126 of the headrest is moved back and at the same time, the parallel lever assembly 128' connected to the mounting panels 124 by the mobile shaft 122 is pivoted backward. The first torsion coil spring 130 supported on the support 182 for the pivotable gear 120 of the check member CM and one of the link portions of the parallel link assembly 118' exerts an elastic restoring force on the parallel link assembly 118' or the tilt adjusting device TAD.

Figure 11B:
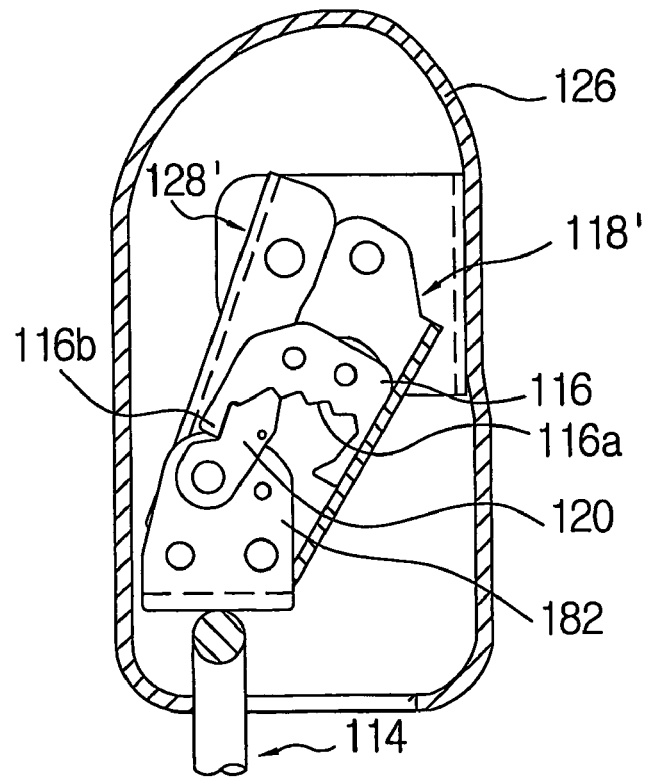

At this time, the teeth 120a of the pivotable gear 120 installed on the support 182 travel on the teeth 116a of the ratchet member RM and meet the front jaw 116b of the ratchet member RM, being biased by means of the elastic force of the second torsion coil spring 121(see FIG. 11b).

Figure 11C:
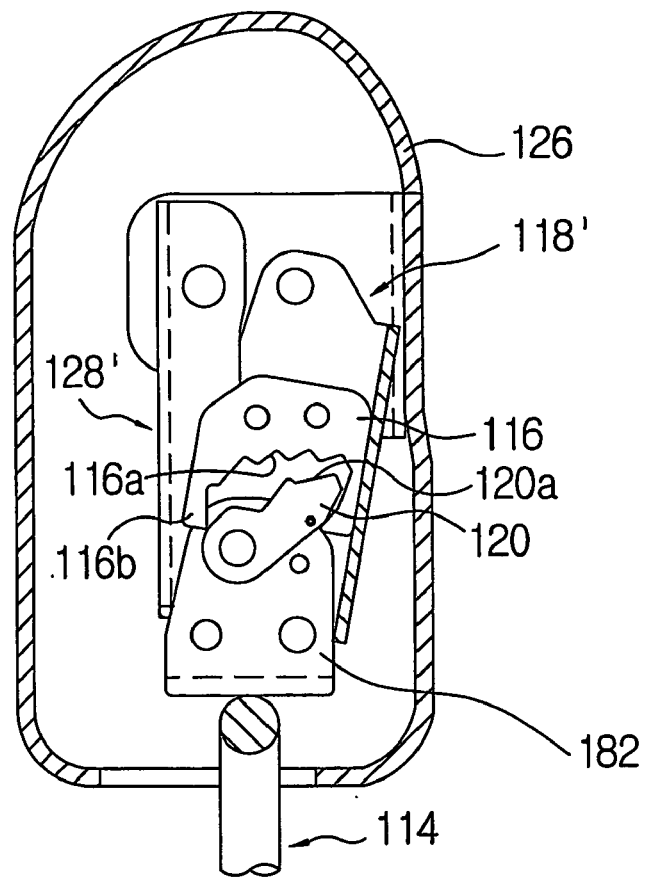
Figure 11D:
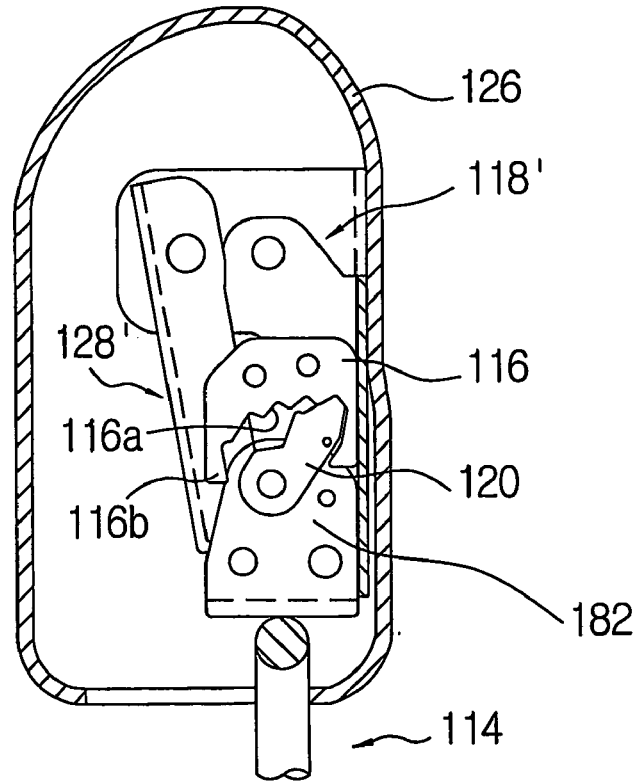

When the teeth 120a of the pivotable gear 120 is about to reach the jaws 116b of the ratchet member RM and the backward pushing force applied to the headrest overcomes the elastic force of the spring 121, the pivotable gear 120 is rotated on the pivot through a certain angle and thus the teeth 120a are disengaged from the teeth 116a of the ratchet member RM(see FIG. 11c).

The pivotable gear 120 rotated on the pivot through a certain angle is then maintained in that position, as it is supported by the elastic force of the spring 121.

When the pushing force is removed after the pivotable gear 120, separated from the ratchet member RM, is further moved backward by a certain distance in the same direction, the mounting panels 124 are forced to return to the original position, as the elastic restoring force of the first torsion coil spring 130 makes the parallel link assembly 118' to pivot forward and to the original position. At the same time, the teeth 120a is caught by the rear jaw 116b of the ratchet member RM, making the pivotable gear 120 to be rotated and the teeth 120a of the pivotable gear 120 to engage again with the rear part of the teeth 116a of the ratchet member RM.

According to such a process, the headrest is moved back and forth to a position desired by the occupant, or returned back to the original position.

Embodiment 3

Figure 12:
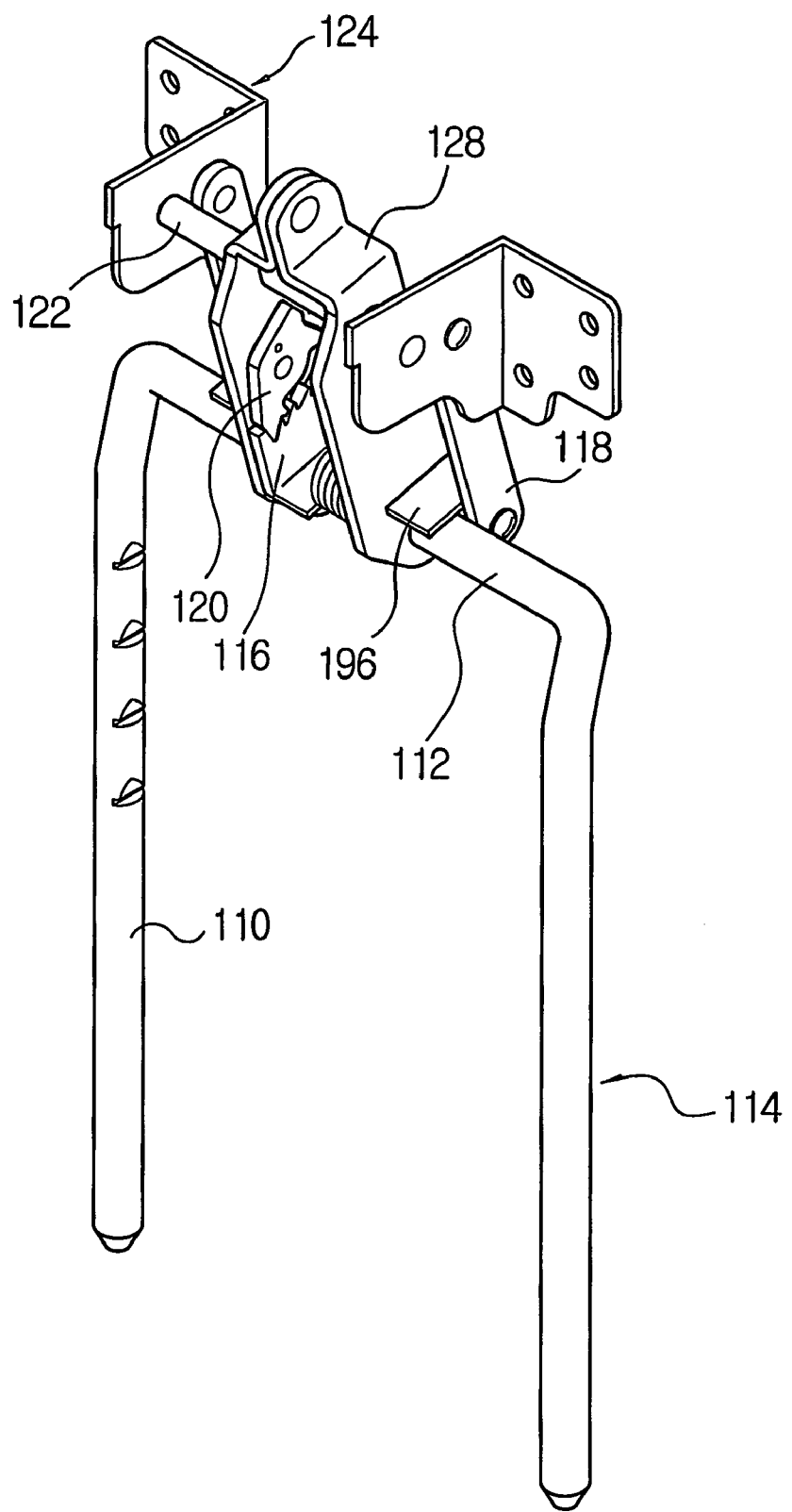
FIG. 12 is a perspective view of the device for moving headrest back and forth according to the third embodiment of the present invention.
Figure 13:
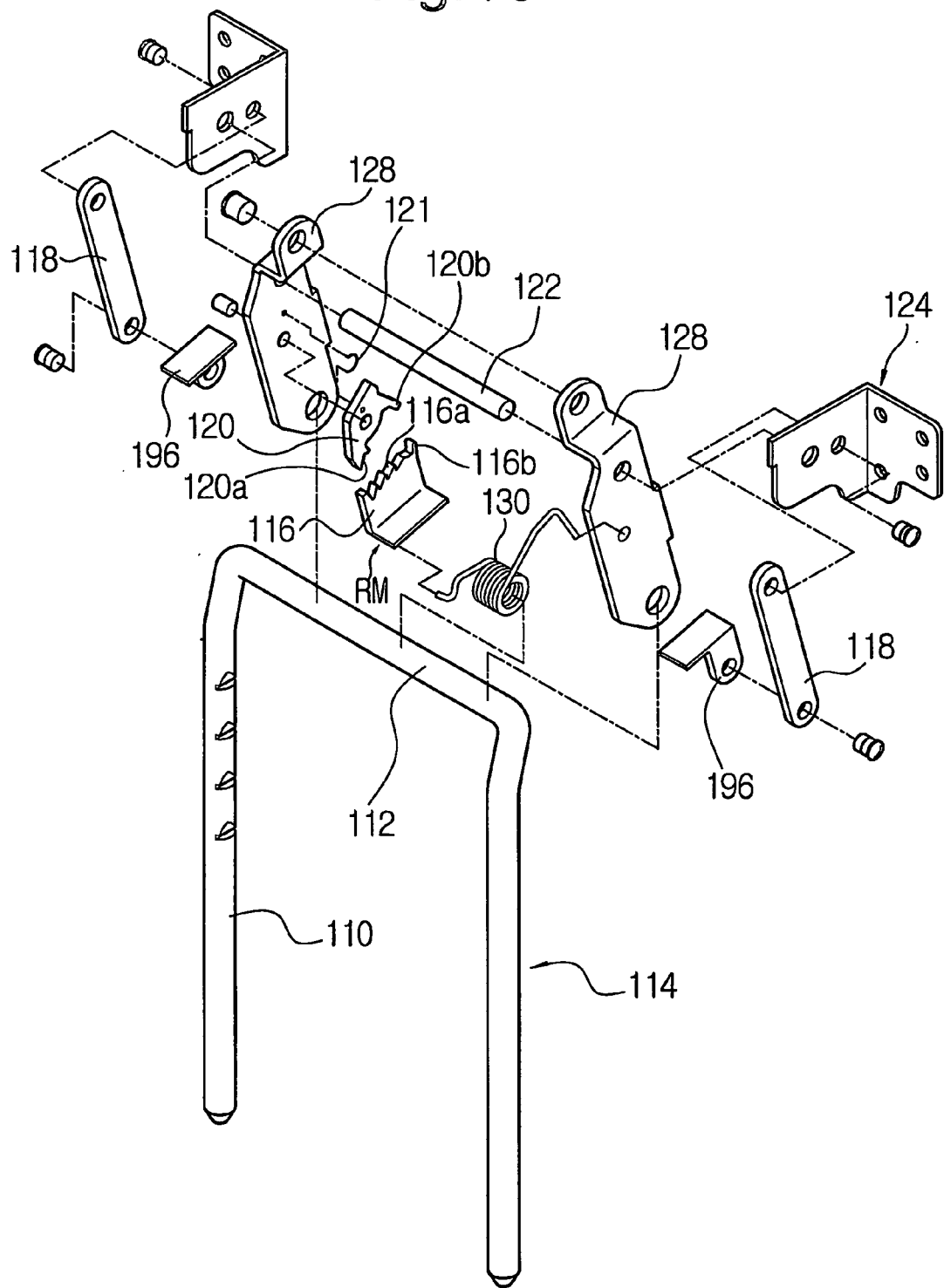
FIG. 13 is an exploded perspective view of the device for moving headrest back and forth of FIG. 12.

FIGS. 12 and 13 are drawings of a device for moving headrest back and forth according to the third embodiment of the present invention. As shown in the drawings, the traversing device comprises; a stay 114 mounted on top of the backrest of a seat and provided with vertical portions 110 and a horizontal portion 112, a ratchet member RM having a gear portion 116 formed with a plurality of teeth 116a and a jaw 116b and fixedly installed on the horizontal portion 112 of the stay 114, a back and forth movement device MD comprising a parallel levers 128 meeting at their upper ends, two lower ends of which are pivotably connected respectively on the horizontal portion 112 of the stay 114 and which is arranged to move the headrest back and forth, a first torsion coil spring 130 supported between the ratchet member RM and one of the parallel levers 128, a check member CM comprising a pivotable gear 120 having teeth 120a and a jaw 120b and pivotably engaging with one of the parallel levers 128, a second torsion coil spring 121 disposed between the other of the parallel levers 128 and the pivotable gear 120, a tilt adjusting device TAD comprising a pair of parallel links 118, each of which has a lower portion in pivotal engagement with one of two supports 196 fixed oppositely on the horizontal portion 112 of the stay 114, a mobile shaft 122 pivotably connecting the upper portions of the parallel levers 128 and a pair of mounting panels 124 pivotably connected to the upper portions of the parallel links 118 and fixed on both ends of the mobile shaft 122.

The ratchet member RM is made of an L shaped plate and fixed on the center of the horizontal portion 112 of the stay 114. The gear portion 116 is formed with a plurality of teeth 116a so as to engage with teeth 120a of the pivotable gear 120 and the jaw 116b for interacting with the jaw 120b of the pivotable gear 120, which is rotatably coupled to one of the parallel levers 128 by a pivot.

Both lower ends of the parallel links 118 are pivotably engaged with the respective supports 196 fixed on the horizontal portion 112 of the stay 114 and having pivot holes for receiving the respective pivots therein. The upper end of each parallel link 118 are pivotably connected to the rear side of the corresponding mounting panel 124.

The first torsion coil spring 130 is an elastic means for causing the back and forth movement device MD, the mounting panels 124 and ultimately the headrest to their original positions. The first torsion coil spring 130 is supported between the ratchet member RM and one of the parallel levers 128.

A hanging hole is formed at the upper portion of the other of the parallel levers 128 so that one end of the second torsion coil spring 121, preferably a wire spring, may be hooked therein, while the other end of the second torsion coil spring 121 is hooked in a hanging hole on the pivotable gear 120.

Each parallel lever 128 has opposite pivot holes for receiving horizontal portion 112 of the stay 114 and the mobile shaft 122.

Other structure of the device for moving headrest back and forth according to the third embodiment is the same as that of the second embodiment and therefore, is not described further herein.

The operation of the above described device for moving headrest back and forth will now be described with reference to FIGS. 14a to 14e.

Figure 14A:
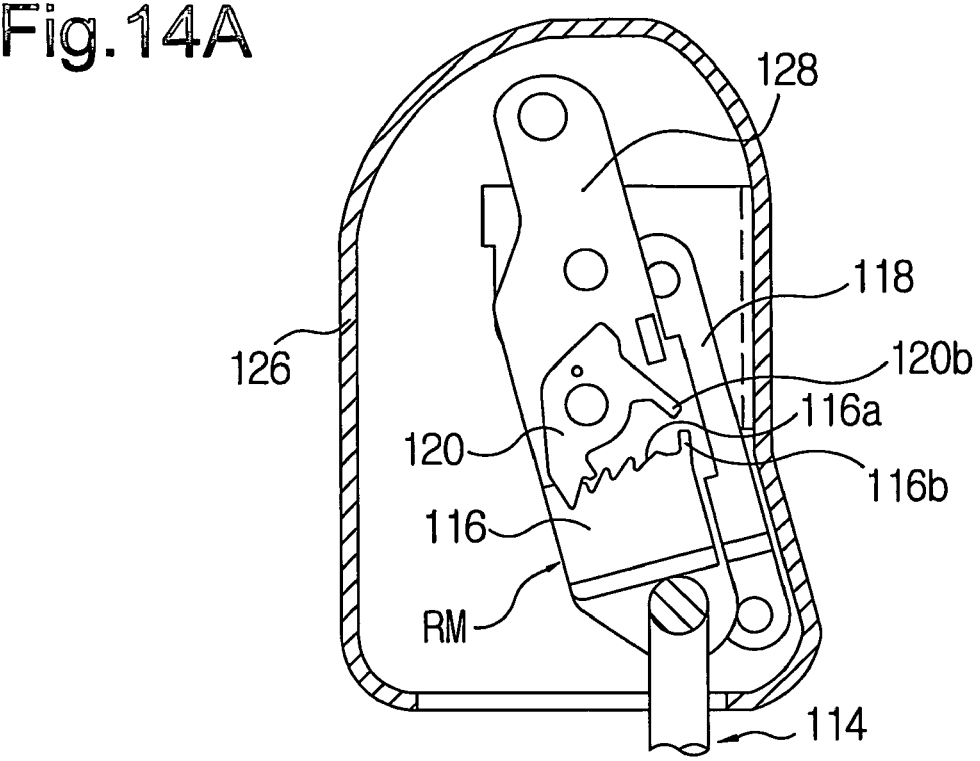
FIGS. 14a to 14e are side sectional views showing the operation the device for moving headrest back and forth of FIG. 12.
Figure 14B:
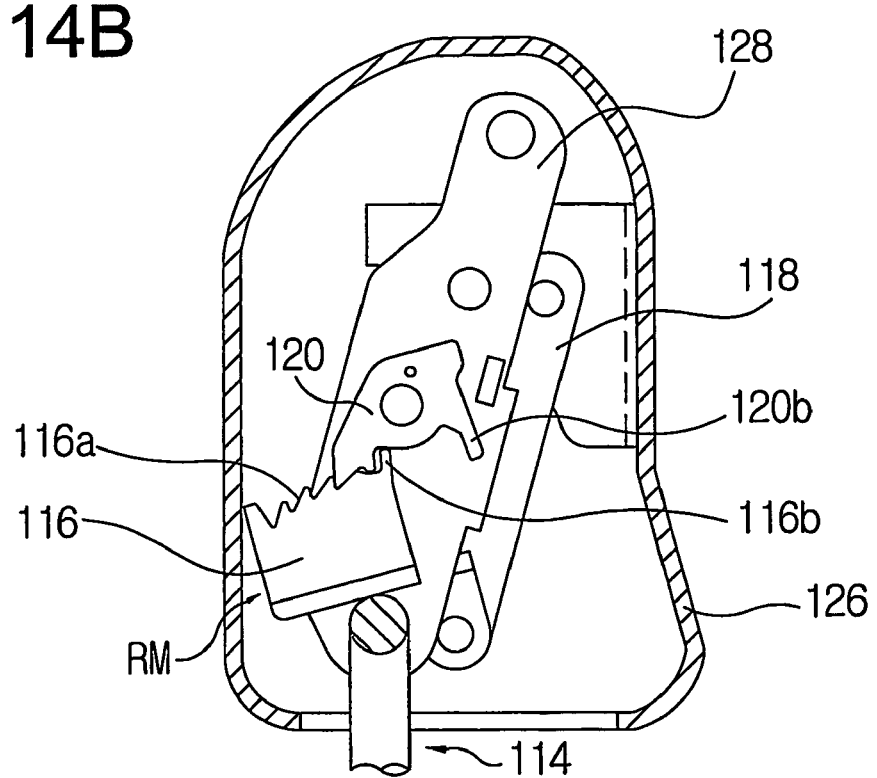

When an occupant on the rear seat pulls the headrest in the original position as FIG. 14a backward, the mounting panels 124 integrally connected to the cover 126 is moved back and at the same time, the back and forth movement device MD comprising the parallel levers and the mobile shaft 122 connected to the mounting panels 124 is pivot backward. The first torsion coil spring 130 supported on the ratchet member RM and one of the parallel levers 128 exerts an elastic restoring force on the parallel levers 128 or the back and forth movement device MD.

At this time, the teeth 120a of the pivotable gear 120 installed on one of the parallel levers 128 travel on the teeth 116a of the ratchet member RM, being biased by means of the elastic force of the second torsion coil spring 121.

Figure 14C:
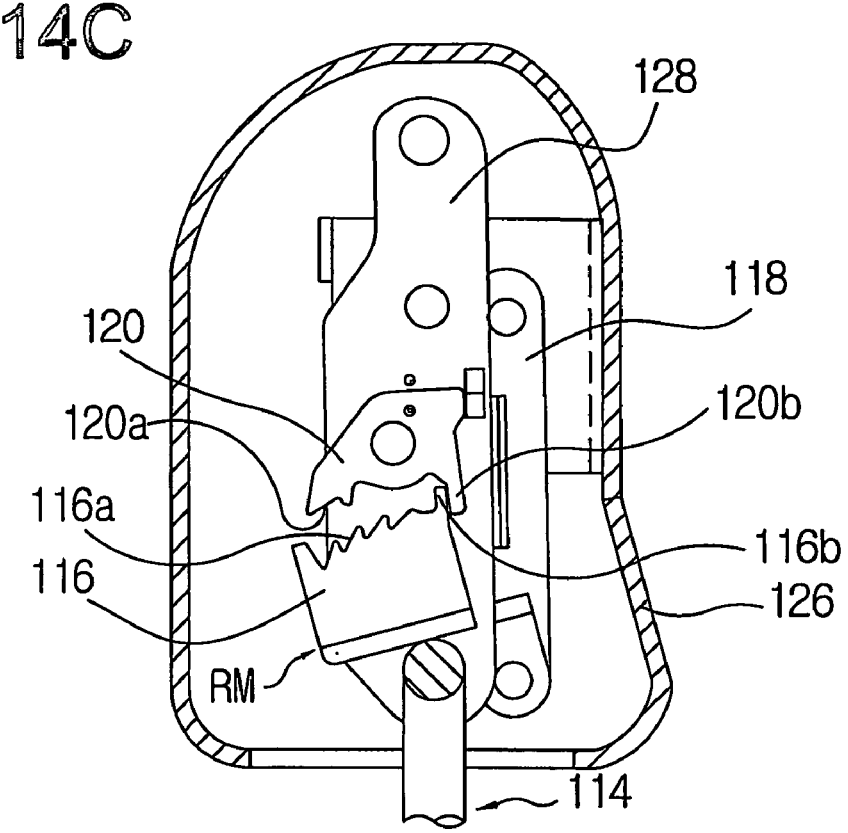

When the teeth 120a of the pivotable gear 120 is about to reach the jaw 116b of the ratchet member RM(see FIG. 14b) and the pulling force applied by the occupant overcomes the elastic forces of the spring 121, the pivotable gear 120 is rotated on the pivot through a certain angle and thus the teeth 120a are disengaged from the teeth 116a of the ratchet member RM(see FIG. 14c).

The pivotable gear 120 rotated as such is then maintained in that position, as they are supported by the elastic force of the spring 121.

Figure 14D:
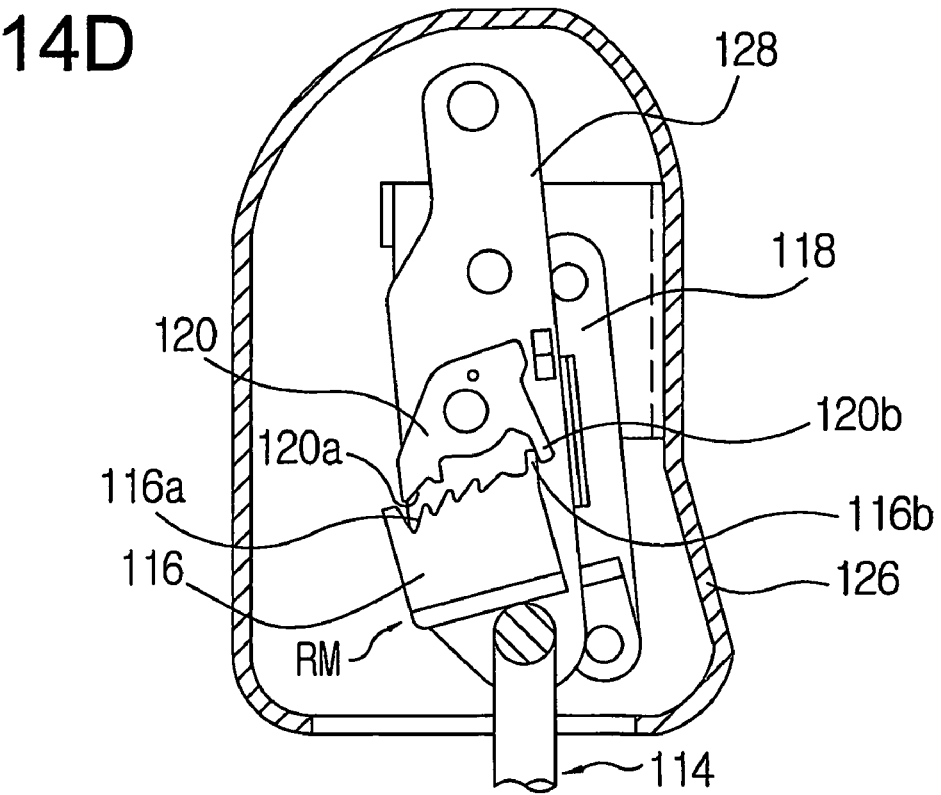
Figure 14E:
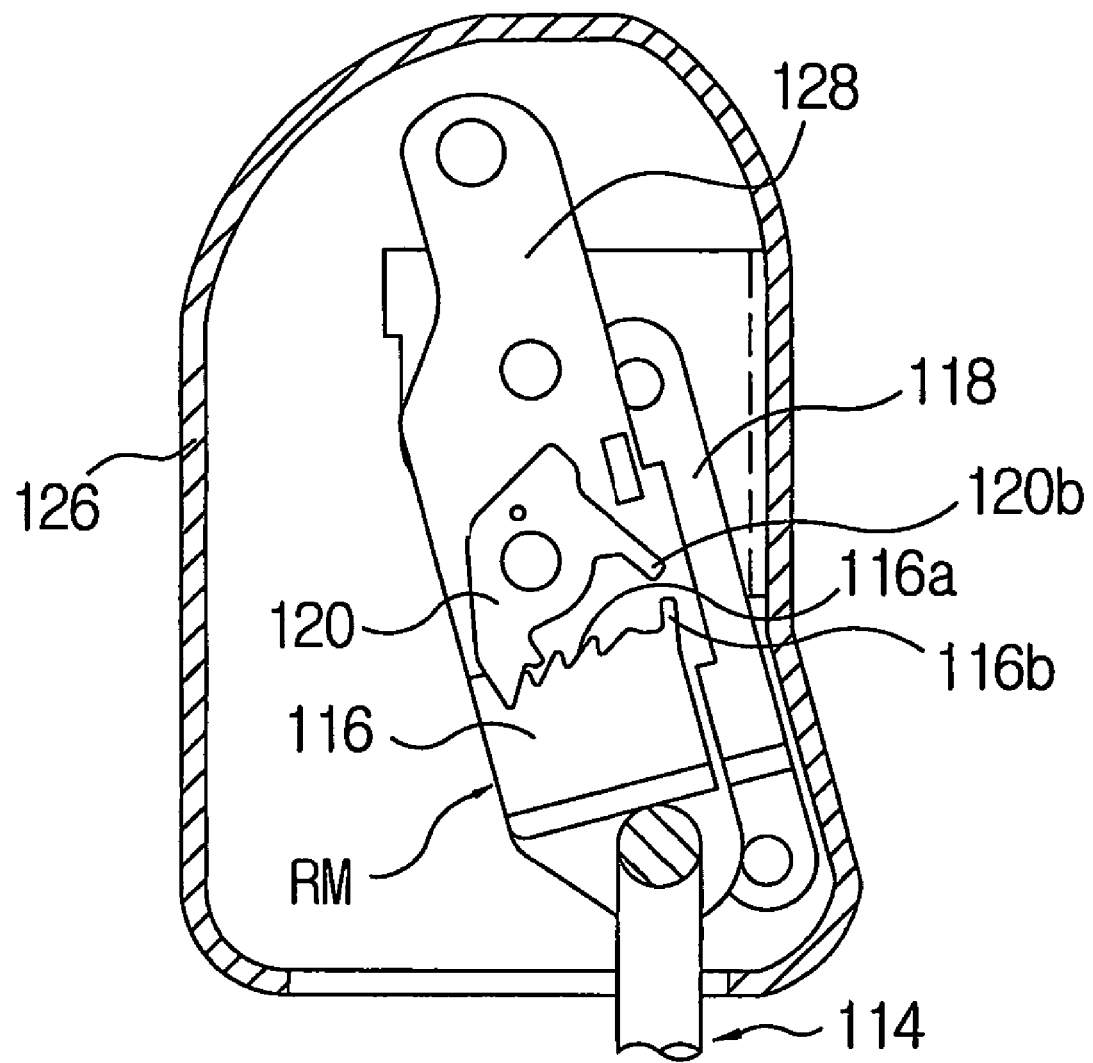

When the pulling force is removed after the pivotable gear 120, separated from the ratchet member RM, is further moved backward by a certain distance in the same direction, the mounting panels 124 are forced to return to the original position, as the elastic restoring force of the first torsion coil spring 130 makes the parallel levers 128 to pivot forward and thus to the original position(see FIG. 14d). At the same time, the jaw 120b is caught by jaw 116b of the ratchet member RM, making the pivotable gear 120 to be rotated and the teeth 120a of the pivotable gear 120 to engage again with the front part of the teeth 116a of the ratchet member RM(see FIG. 14e).

As such a process is repeated, the device for moving headrest back and forth is moved back and forth to a position desired by the occupant, or returned back to the original position.

Figure 15:
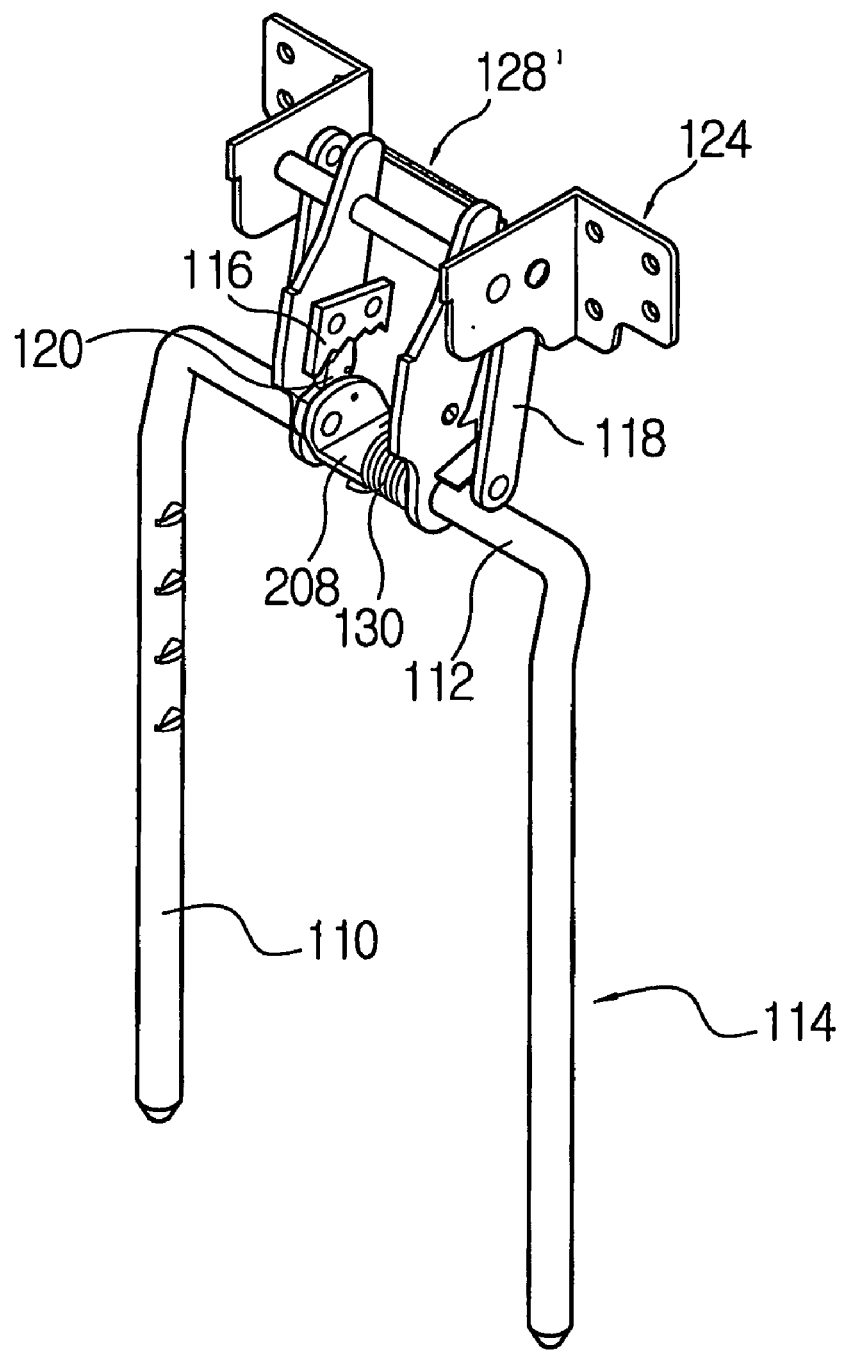
FIG. 15 is a perspective view of a modified device for moving headrest back and forth of the third embodiment of the present invention.
Figure 16:
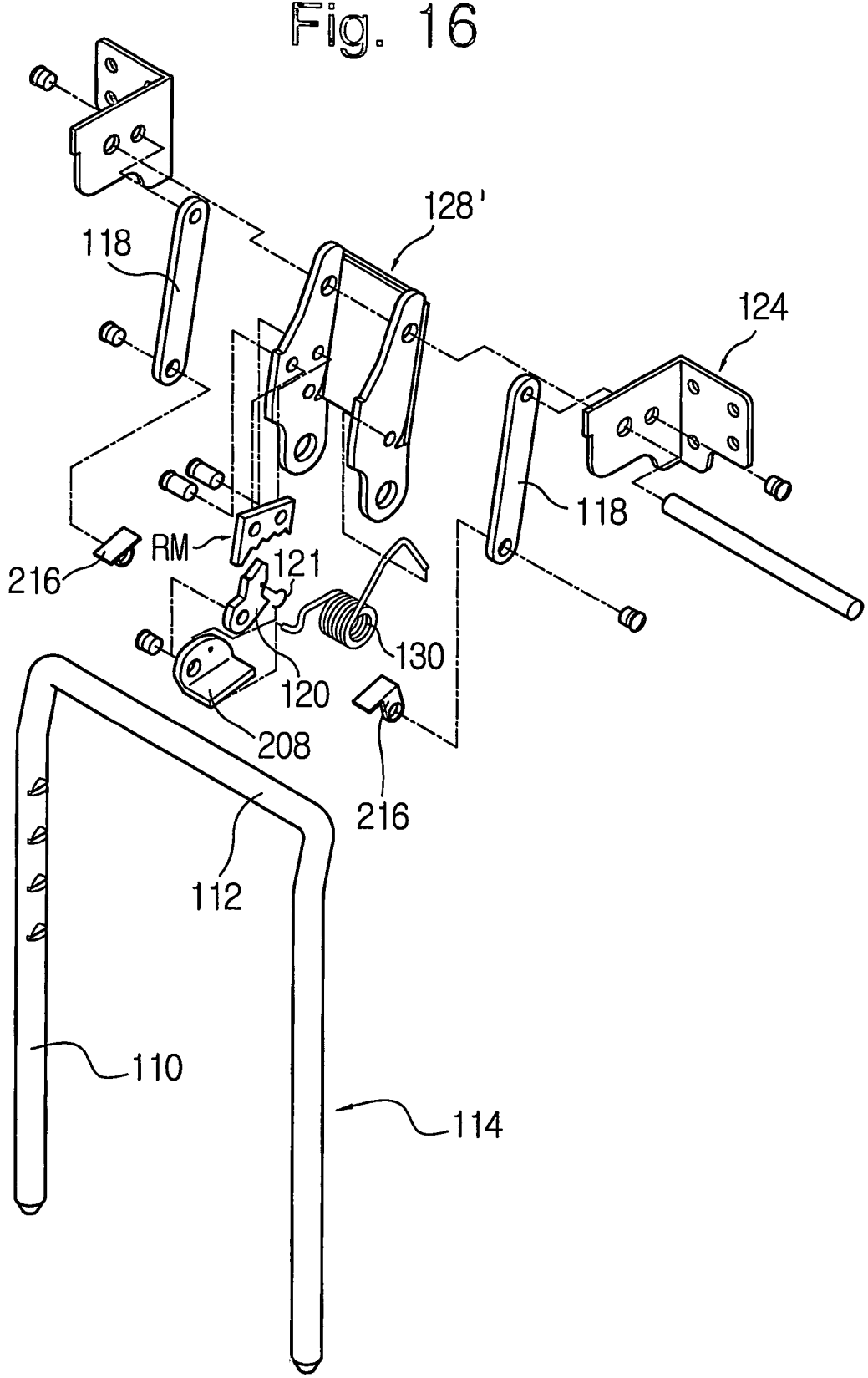
FIG. 16 is an exploded perspective view of the device for moving headrest back and forth of FIG. 15.
Figure 17A:
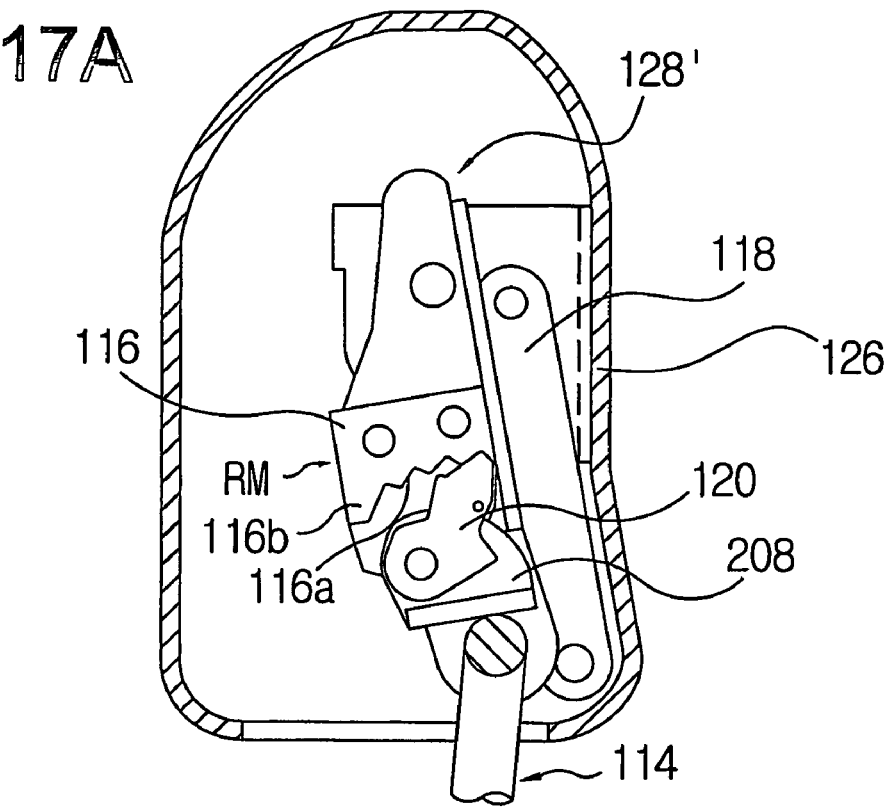
FIGS. 17a to 17d are side sectional views showing operation of the device for moving headrest back and forth of FIG. 15.
Figure 17B:
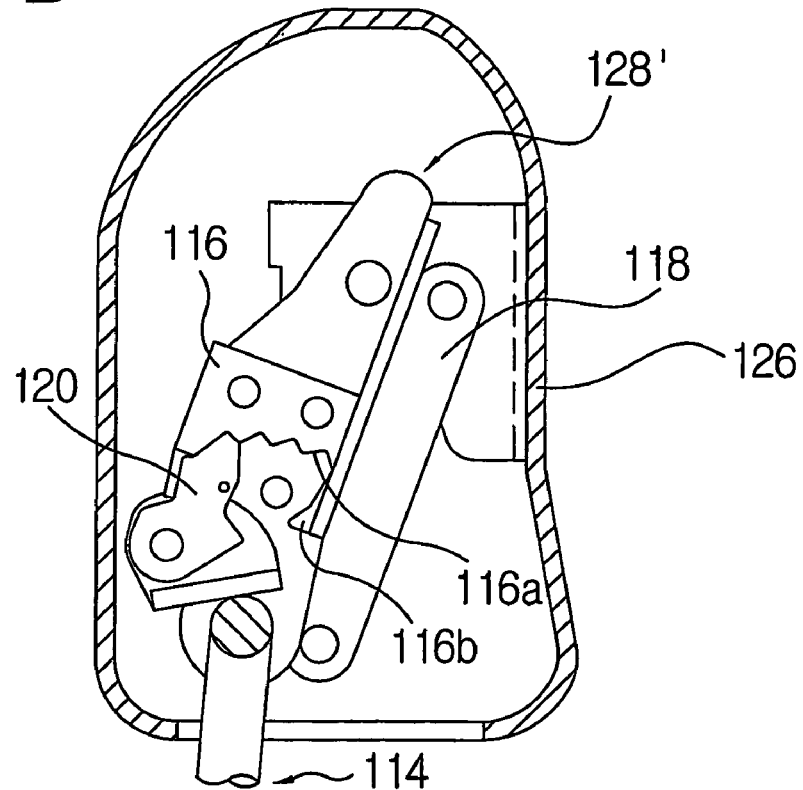
Figure 17C:
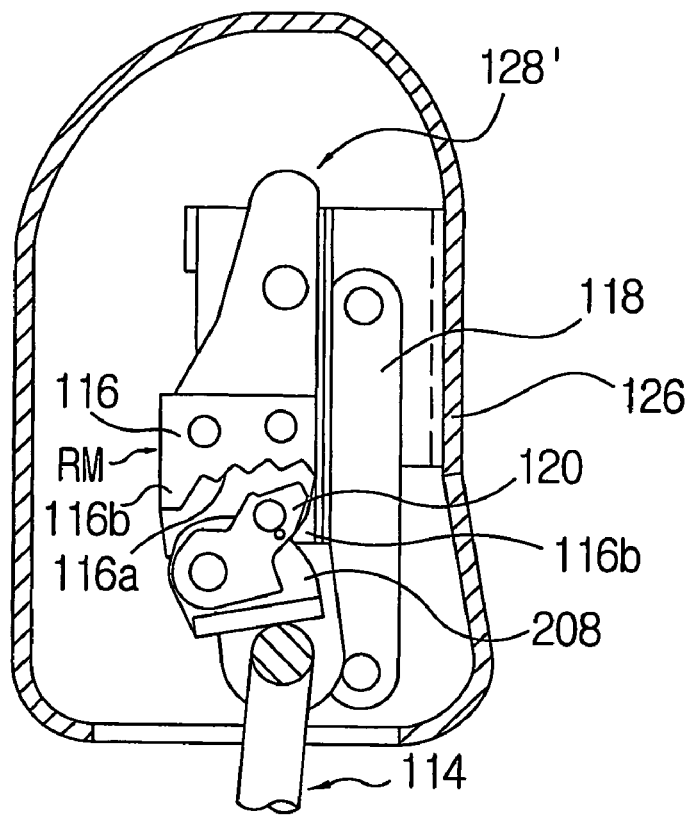
Figure 17D:
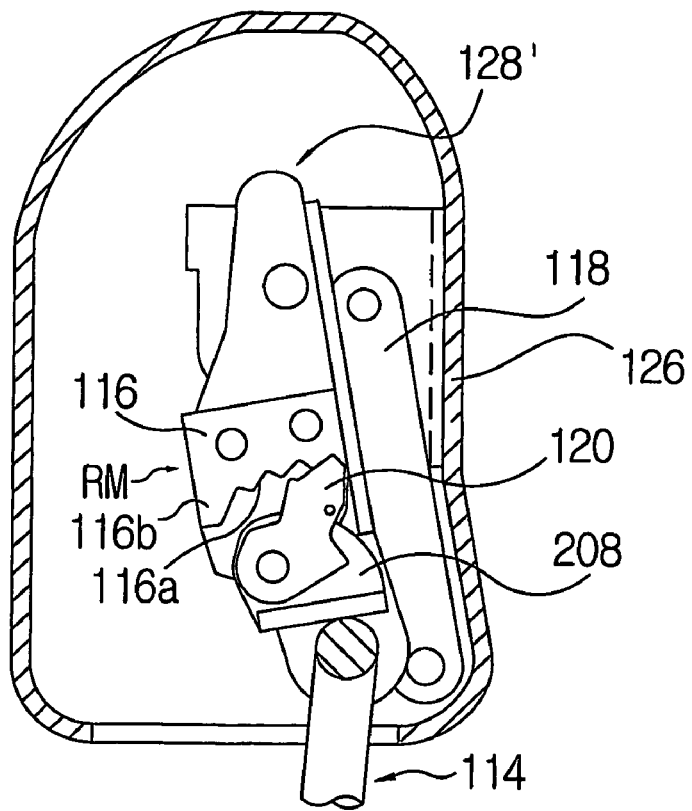

FIGS. 15 and 16 show a modified device for moving headrest back and forth of the third embodiment of the present invention, in which locations of the ratchet member RM and the pivotable gear 120 are reversed. In the modified device, the parallel levers 128 with both upper ends meeting together of the third embodiment are replaced by a parallel lever assembly 128' being similar to the parallel lever assembly 128' of the second embodiment of the present invention, a pivotable gear 120 is fixed on the support 208 installed on the horizontal portion 112 of the stay 114 and a ratchet member RM is fixed to the inner surface of one of the opposite lever portions of the parallel lever assembly 128', while other elements are the same as those of the third embodiment.

The operation of the above device for moving headrest back and forth will not be described further herein, as the above device for moving headrest back and forth is operated in the same way as the device of the second embodiment, as can be seen from FIGS. 11a to 11d and FIGS. 17a to 17d.

Figure 18:
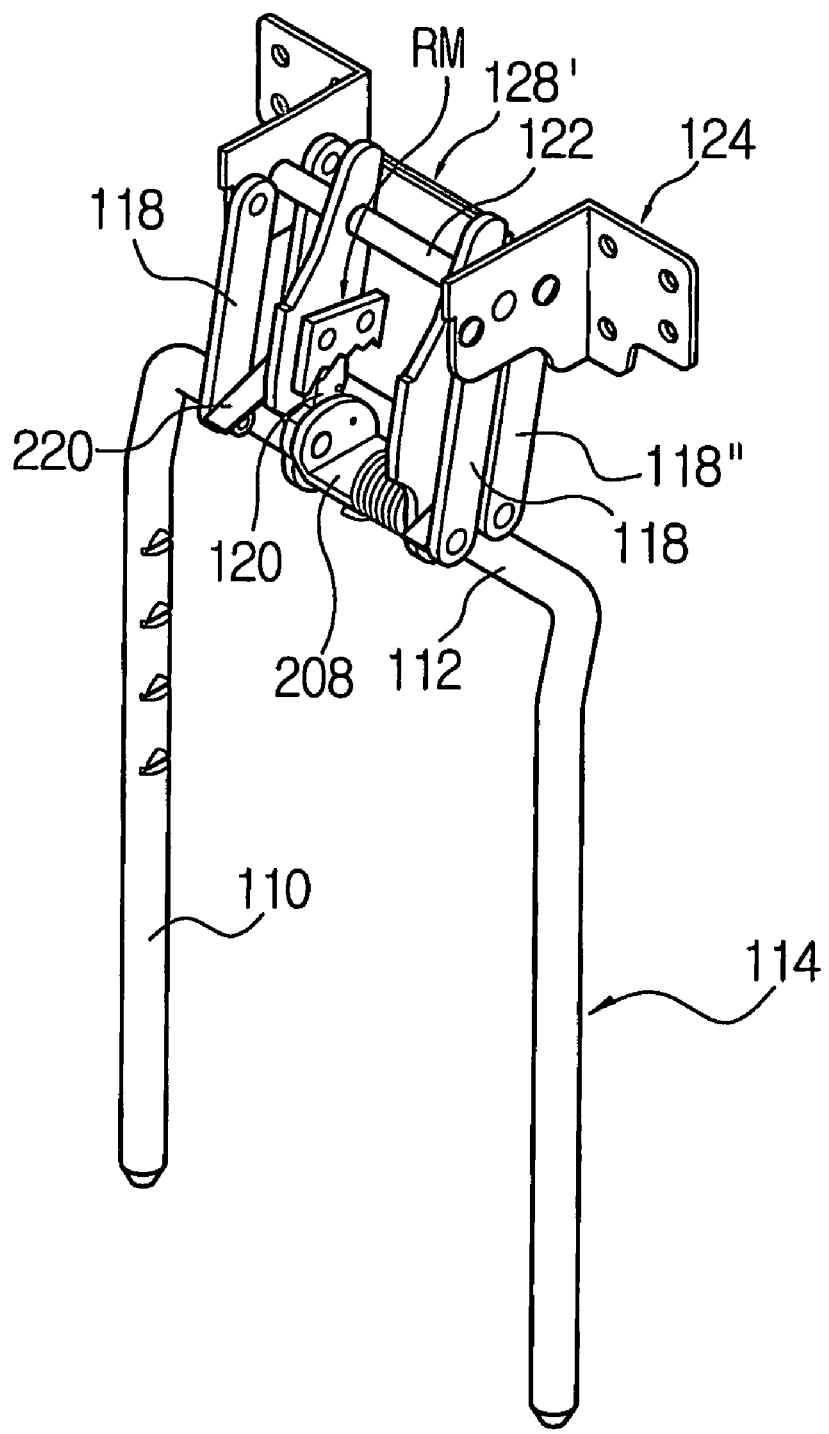
FIG. 18 is a perspective view of another modified device for moving headrest back and forth of the third the fourth embodiment of the present invention.

The device for moving headrest back and forth of FIGS. 15 and 16 may be modified as the one of FIGS. 18 and 19, in which an additional pair of parallel links 118' which are arranged in parallel with the parallel links 118 and the lower port ions thereof are pivotably coupled to a common support 220 fixed on the horizontal portion 112 of the stay 114.

The device for moving headrest back and forth of FIGS. 18 and 19 is operated in the same manner as the device of FIGS. 15 and 16, as illustrated in FIGS. 17a to 17d.

It will be understood by those of ordinary skill in the art that any one of the embodiments herein described and illustrated may be modified or revised within the scope of the teachings of the present invention.

The present invention is not limited to the specific embodiments herein shown and described but departures may be made therefrom within the scope of the accompanying claims without departing from the principles of the invention.

INDUSTRIAL APPLICABILITY

The device for moving headrest back and forth of the present invention has advantages in that the structure of the device is simplified, production costs are reduced and the work efficiency in manufacture is improved, as the tilt adjusting device and the back and forth movement device are united into a single device.

What is claimed is:

1. A device for moving a headrest back and forth, comprising
   a stay (114) mounted with a horizontal portion (112) and a pair of parallel vertical portions (110);
   a ratchet member (RM) provided with a gear portion (116) formed with a plurality of teeth (116a) and a jaw (116b) and disposed on a central part of the horizontal portion (112) of the stay (114);
   a tilt adjusting device (TAD) comprising a pair of parallel members, each having a lower portion in pivotal engagement with the horizontal portion (112) of said stay (114);
   a check member (CM) comprising one or a pair of pivotable gears (120) having teeth (120a) to travel on and engage with the teeth (116a) of said ratchet member (RM) installed so that the reverse rotation of said tilt adjusting device (TAD) may be prevented;
   a back and forth movement device (MD) comprising a pair of parallel members, one end of which is pivotably connected to the horizontal portion (112) of said stay (114), adjoining said ratchet member (RM) and arranged to move the headrest back and forth;
   a first torsion coil spring (130), two ends of which are respectively hooked on the horizontal portion (112) of said stay (114) and one of the parallel members of said tilt adjusting device (TAD) or said back and forth movement device (MD);
   one or a pair of second torsion coil springs (121) having one end hooked on said pivotable gear (120); and
   a mobile shaft (122) axially mounted to pass through upper portions of the parallel members of said back and forth movement device (MD).

2. The device for moving a headrest back and forth as claimed in claim 1, further comprising one or a pair of mounting panels (124) fixed on said mobile shaft (122).

3. The device for moving a headrest back and forth as claimed in claim 2, wherein said ratchet member (RM) has two opposite gear portions (116).

4. The device for moving a headrest back and forth as claimed in claim 2, wherein said pivotable gear (120) has a jaw (120b) for interacting with the jaw (116b) of said ratchet member (RM) and is pivotably arranged on either a support fixed on the horizontal portion (112) of said stay (114) or one of the two parallel members of said tilt adjusting device (TAD) or said back and forth movement device (MD).

5. The device for moving a headrest back and forth as claimed in claim 2, wherein the parallel members of said tilt adjusting device (TAD) or said back and forth movement device (MD) are installed in pivotal engagement with the horizontal portion of said stay (114) by a shaft passing through holes in said members and said ratchet member (RM) or said support for said pivotable gear (120).

6. The device for moving a headrest back and forth as claimed in claim 2, wherein one end of said first torsion coil spring (130) is hooked on said ratchet member (RM) or a support for said pivotable gear (120) fixed on the horizontal portion of said stay (114).

7. The device for moving a headrest back and forth as claimed in claim 2, wherein said second torsion coil spring has the other end hooked on one of the parallel members of said tilt adjusting device (TAD) or said back and forth movement device (MD).

8. The device for moving a headrest back and forth as claimed in claim 1, wherein said ratchet member (RM) has two opposite gear portions (116).

9. The device for moving a headrest back and forth as claimed in claim 1, wherein said pivotable gear (120) has a jaw (120b) for interacting with the jaw (116b) of said ratchet member (RM) and is pivotably arranged on either a support fixed on the horizontal portion (112) of said stay (114) or one of the two parallel members of said tilt adjusting device (TAD) or said back and forth movement device (MD).

10. The device for moving a headrest back and forth as claimed in claim 1, wherein the parallel members of said tilt adjusting device (TAD) or said back and forth movement device (MD) are installed in pivotal engagement with the horizontal portion of said stay (114) by a shaft passing through holes in said members and said ratchet member (RM) or a support for said pivotable gear (120).

11. The device for moving a headrest back and forth as claimed in claim 1, wherein one end of said first torsion coil spring (130) is hooked on said ratchet member (RM) or a support for said pivotable gear (120) fixed on the horizontal portion of said stay (114).

12. The device for moving a headrest back and forth as claimed in claim 11, wherein said first torsion coil spring (130) is wound around the horizontal portion of said stay (114).

13. The device for moving a headrest back and forth as claimed in claim 1, wherein said second torsion coil spring has the other end hooked on one of the parallel members of said tilt adjusting device (TAD) or said back and forth movement device (MD).

14. The device for moving a headrest back and forth as claimed in claim 1, wherein sail pivotable gear (120) has a jaw (120b) for interacting with the jaw (116b) of said ratchet member RM and is pivotably arranged on either a support fixed on the horizontal portion (112) of said stay (114) or one of the two parallel members of said tilt adjusting device (TAD) or said back and forth movement device (MD).

15. The device for moving a headrest back and forth as claimed in claim 1, wherein the parallel members of said tilt adjusting device (TAD) or said back and forth movement device (MD) are installed in pivotal engagement with the horizontal portion of said stay (114) by a shaft passing through holes in said members and said ratchet member (RM) or said support for said pivotable gear (120).

16. The device for moving a headrest back and forth as claimed in claim 1, wherein one end of said first torsion coil spring (130) is hooked on said ratchet member (RM) or a support for said pivotable gear (120) fixed on the horizontal portion of said stay (114).

17. The device for moving a headrest back and forth as claimed in claim 1, wherein said second torsion coil spring has the other end hooked on one of the parallel members of said tilt adjusting device (TAD) or said back and forth movement device (MD).

* * * * *